(12) United States Patent
Kobayashi et al.

(10) Patent No.: US 8,554,436 B2
(45) Date of Patent: Oct. 8, 2013

(54) VEHICLE DRIVING ASSIST SYSTEM

(75) Inventors: Yousuke Kobayashi, Yokohama (JP); Genpei Naito, Yokohama (JP); Takeshi Kimura, Yokohama (JP); Hiroyuki Yoshizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1467 days.

(21) Appl. No.: 11/498,102

(22) Filed: Aug. 3, 2006

(65) Prior Publication Data

US 2007/0030132 A1 Feb. 8, 2007

(30) Foreign Application Priority Data

Aug. 3, 2005 (JP) .................................. 2005-225565

(51) Int. Cl.
*G06F 19/00* (2011.01)

(52) U.S. Cl.
USPC .............................. 701/70; 701/300; 701/301

(58) Field of Classification Search
USPC ................... 701/70, 300, 301; 340/435, 436
See application file for complete search history.

(56) References Cited

U.S. PATENT DOCUMENTS

| | | | |
|---|---|---|---|
| 5,502,432 A * | 3/1996 | Ohmamyuda et al. | 340/436 |
| 7,327,237 B2 * | 2/2008 | Kimura et al. | 340/436 |
| 7,668,633 B2 * | 2/2010 | Diebold et al. | 701/36 |
| 7,904,245 B2 * | 3/2011 | Kimura et al. | 701/301 |
| 7,904,246 B2 * | 3/2011 | Kondoh et al. | 701/301 |
| 2003/0233187 A1 * | 12/2003 | Egami | 701/96 |
| 2004/0080405 A1 | 4/2004 | Hijikata | |
| 2006/0195231 A1 * | 8/2006 | Diebold et al. | 701/1 |

FOREIGN PATENT DOCUMENTS

| | | | |
|---|---|---|---|
| EP | 1285842 | A2 | 2/2003 |
| EP | 1375234 | A2 | 1/2004 |
| EP | 1526028 | A2 | 4/2005 |
| EP | 1544071 | A1 | 6/2005 |
| JP | H08-132996 | A | 5/1996 |
| JP | 2000-108719 | A | 4/2000 |
| JP | 2002-67843 | A | 3/2002 |
| JP | 2004-189141 | A | 7/2004 |
| JP | 2004-322784 | A | 11/2004 |
| JP | 2005-112242 | | 4/2005 |

* cited by examiner

*Primary Examiner* — James Trammell
*Assistant Examiner* — Jerrah Edwards
(74) *Attorney, Agent, or Firm* — Global IP Counselors, LLP

(57) ABSTRACT

A vehicle driving assist system has a controller configured to calculate a risk potential indicative of the degree of convergence between a host vehicle in which the system is installed and a preceding obstacle. Then, the controller performs a driver notification controlling operation that produces a driver notification stimulus based on the risk potential. Considering the acceleration of the preceding obstacle, the speed of the host vehicle, and the following distance between the host vehicle and the preceding obstacle, the controller calculates a threshold value for determining when to commence the control of the driver notification controlling operation.

17 Claims, 23 Drawing Sheets

(a) CASE WHEN THE DISTANCE BETWEEN BOTH VEHICLES IS LONG (b) CASE WHEN THE DISTANCE BETWEEN BOTH VEHICLES IS SHORT

VEHICLE DRIVING ASSIST SYSTEM

CROSS-REFERENCE TO RELATED APPLICATIONS

This application claims priority under 35 U.S.C. §119 to Japanese Patent Application No. 2005-225565. The entire disclosure of Japanese Patent Application No. 2005-225565 is hereby incorporated herein by reference.

BACKGROUND OF THE INVENTION

1. Field of the Invention

The present invention relates to a vehicle driving assist system that assists a driver with respect to the operation of a vehicle.

2. Background Information

An example of a vehicle driving assist system is disclosed in Japanese Laid-Open Patent Publication No. 2005-112242. In this system, a risk potential is calculated based on the traffic situation existing in the area surrounding a host vehicle employing the system, and a driver-operated driving operation device is control based on the calculated risk potential. The system estimates the possibility of contact between the host vehicle and an obstacle and reduces the amount of drive torque generated relative to the accelerator pedal actuation amount upon determining high possibility of contact. This system also reduces the drive torque when the time to head way (following time) between the host vehicle and the preceding obstacle falls below a threshold value.

SUMMARY OF THE INVENTION

With the system described above, the driver becomes aware of the risk potential and the possibility of a collision by the system manipulating the actuation reaction force and the drive torque. However, the determination of when to commence the control is based solely on the temporal spacing (time to head way) between the host vehicle and the preceding obstacle.

The risk posed to the host vehicle by a preceding obstacle differs depending on whether the preceding obstacle is accelerating or decelerating. Thus, the timing to commence the control would be better to adjusted based whether the preceding obstacle is accelerating or decelerating. When the timing to commence the control is preformed in the same manner regardless of the acceleration of the preceding obstacle, it is difficult to convey the risk potential to the driver in an effective manner and there is the possibility that the control will feel odd to the driver.

To attain the above mentioned object of the present invention, a vehicle driving assist system is provided that basically comprises a traveling situation detecting section, a risk potential calculating section, a control section, a preceding obstacle acceleration computing section, and a control execution threshold value correcting section. The traveling situation detecting section is configured to output a traveling situation detection result based on at least a following distance between a host vehicle and a preceding obstacle and a host vehicle speed of the host vehicle. The risk potential calculating section is configured to calculate a risk potential indicative of a degree of convergence between the host vehicle and the preceding obstacle based on the traveling situation detection result of the traveling situation detecting section. The control section configured to perform a driver notification controlling operation that produces a driver notification stimulus based on the risk potential calculated by the risk potential calculating section. The preceding obstacle acceleration computing section is configured to compute an acceleration of the preceding obstacle based on the traveling situation detection result of the traveling situation detecting section. The control execution threshold value correcting section is configured to correct a preliminary control execution threshold value to obtain a corrected control execution threshold value based on the acceleration of the preceding obstacle computed by the preceding obstacle acceleration computing section. The risk potential calculating section being further is configured to calculate the risk potential in accordance with the corrected control execution threshold value calculated by the control execution threshold value correcting section.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
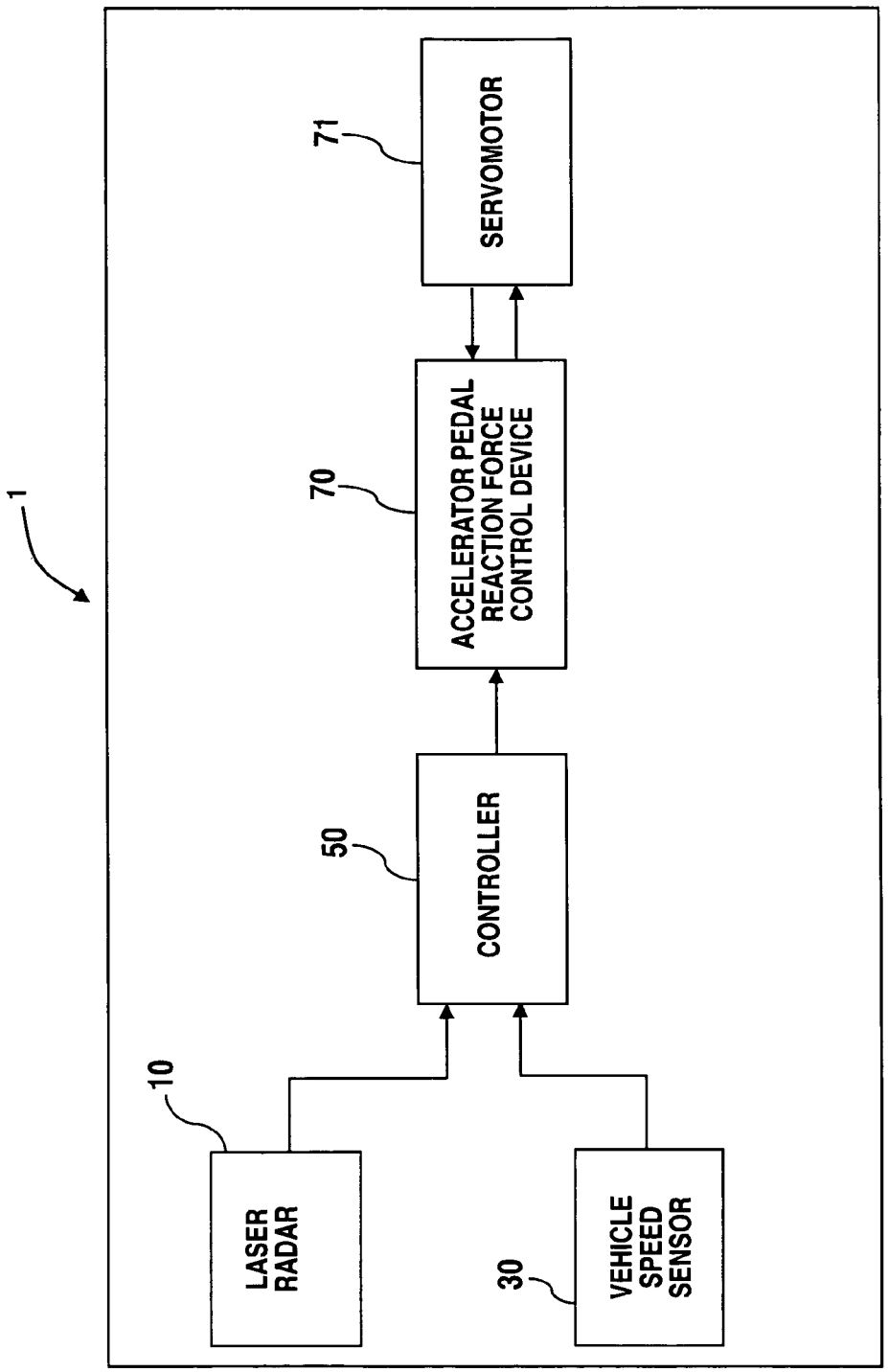
FIG. 1 is a block diagram of a vehicle driving assist system in accordance with a first embodiment of the present invention.
Figure 2:
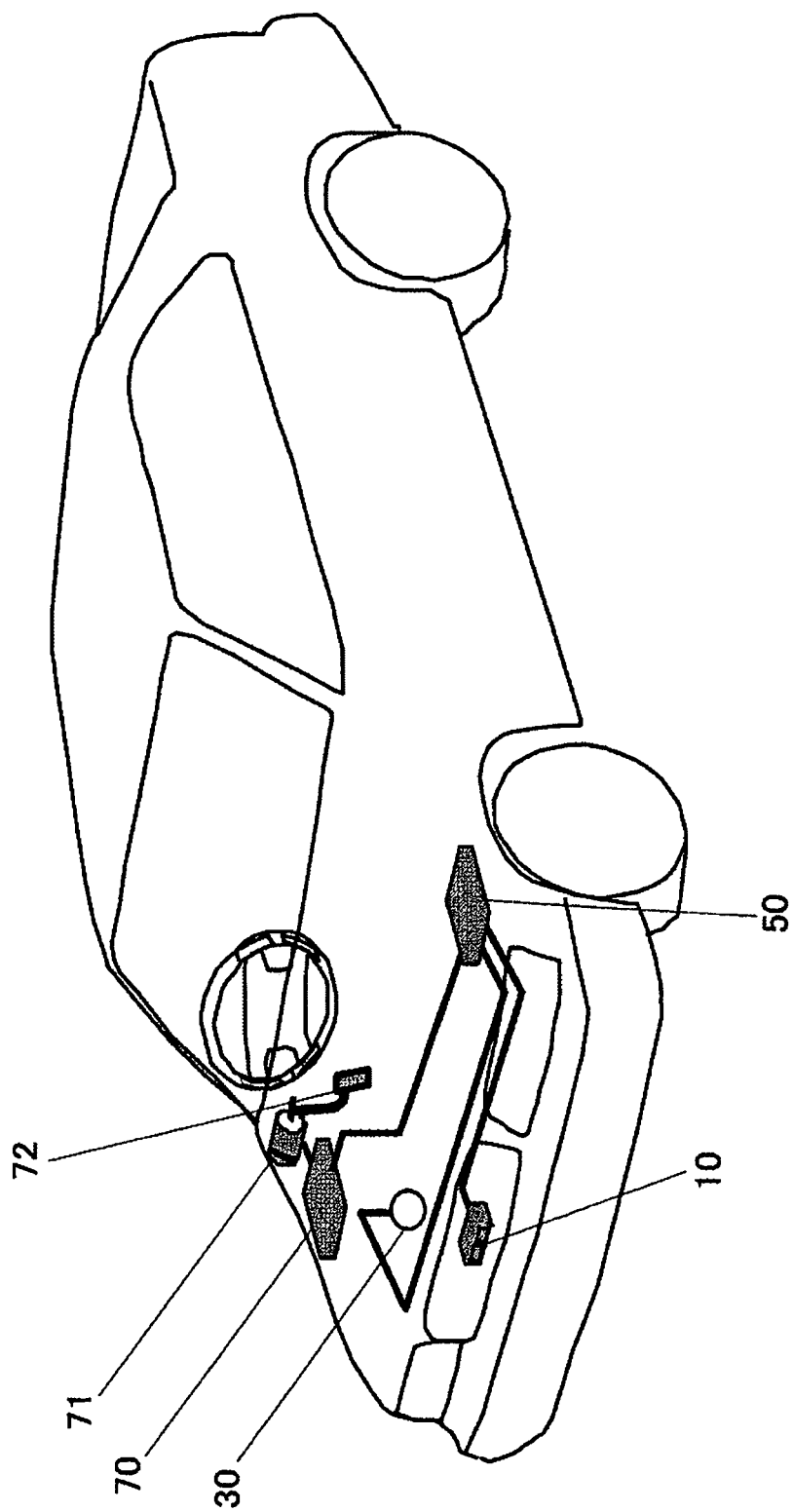
FIG. 2 is a schematic view of a vehicle in which the vehicle driving assist system shown in FIG. 1 is installed.

Referring initially to FIG. 1, a vehicle driving assist system is illustrated in accordance with a first embodiment of the present invention. FIG. 1 is a block diagram of a vehicle driving assist system in accordance with the first embodiment of the present invention. FIG. 2 is a schematic perspective view of a vehicle (hereinafter also called "the host vehicle") in which the vehicle driving assist system shown in FIG. 1 is installed in accordance with the first embodiment of the present invention. With the present invention, as explained below, the vehicle driving assist system using a threshold value to determine when to commence (execute) the control of at least one of an actuation reaction force exerted by a driver-operated driving operation device of the host vehicle and a braking/driving force exerted against the host vehicle based on the risk potential calculated by the risk potential calculating section. An initial threshold value is corrected to a corrected control execution threshold value based on the acceleration of an obstacle existing in front of the host vehicle. Then a risk potential is calculated in accordance with the corrected control execution threshold value. As a result, the determination as to the commencement of the control can be made in consideration of whether the preceding obstacle is accelerating or decelerating. Also the necessary risk potential notification can then be conveyed to the driver without imparting an odd feeling to the driver.

First, the main structures and features of the vehicle driving assist system will now be explained. A laser radar 10 is mounted to a front grill portion, a bumper portion, or the like of the host vehicle and serves to horizontally scan a region in front of the host vehicle with an infrared light pulse. The laser radar 10 then measures the reflected light resulting from the infrared light reflecting off of a plurality of reflecting objects located in front of the host vehicle (normally, the rear ends of preceding vehicles). By measuring the time required for the reflected light to arrive, the laser radar 10 detects the following distance and existence direction to a plurality of preceding vehicles. The detected following distances and existence directions are sent to a controller 50. In this embodiment, the existence directions of preceding objects can be expressed as a relative angle with respect to the vehicle in which the driving assist system 1 is installed. The region in front of the host vehicle scanned by the laser radar 10 is, for example, ±6 degrees with respect to the front of the host vehicle and the system detects preceding objects existing within this angular range.

The vehicle speed sensor 30 is configured and arranged to detect the speed of the host vehicle. The vehicle speed sensor 30 outputs a signal indicative of the speed of the host vehicle to the controller 50. For example, the vehicle speed sensor 30 is configured and arranged to measure the rotational speed of the wheels and the rotational speed of the output side of the transmission, and then output the detected vehicle speed to the controller 50.

The controller 50 comprises a CPU and a ROM, a RAM, and other components peripheral to the CPU and serves to control the entire vehicle driving assist system 1. Based on the speed of the host vehicle received from the vehicle speed sensor 30 and the following distance information received from the laser radar 10, the controller 50 recognizes the obstacle situation in the vicinity of the host vehicle, e.g., recognizes the traveling situation with respect to the preceding obstacles in terms of relative distances and relative velocities with respect to the preceding obstacles. Based on the preceding obstacle situation, the controller 50 calculates risk potentials indicating the degree of convergence between the host vehicle and each preceding obstacle. The controller 50 also executes the control described below based on the risk potentials with respect to the obstacles.

By controlling the reaction force generated when an accelerator pedal 72 (which is a driver-operated driver operation device) is depressed, the vehicle driving assist system 1 assists driver in an appropriate manner with respect to acceleration and deceleration of the host vehicle. In order to accomplish this, the controller 50 calculates a vehicle longitudinal reaction force control amount based on the risk potentials with respect to the preceding obstacles in front of the host vehicle. The controller 50 outputs the calculated longitudinal reaction force control amount to an accelerator pedal reaction force control device 70.

Based on the reaction force control amount from the controller 50, the accelerator pedal reaction force control device 70 controls the torque generated by a servomotor 71 built into a linkage mechanism of the accelerator pedal 72. The servomotor 71 is configured and arranged to control the reaction force generated based on a command value from the accelerator pedal reaction force control device 70 and can freely control the actuation reaction force (accelerator pedal depression force) generated when the driver operates the accelerator pedal 72.

Figure 3:
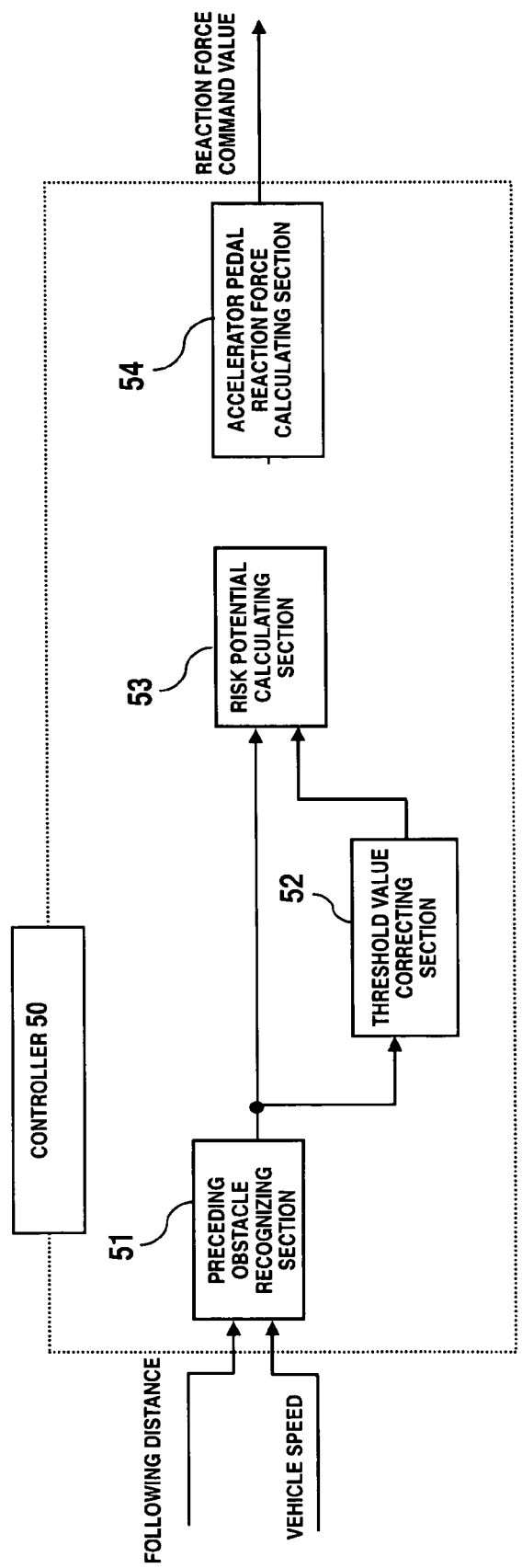
FIG. 3 is a block diagram showing the internal components of the controller of the first embodiment.

FIG. 3 is a simplified block diagram of the internal and peripheral components of the controller 50. The controller 50 preferably includes a microcomputer with a control program that controls the system 1 in a manner as discussed below. The controller 50 can also include other conventional components such as an input interface circuit, an output interface circuit, and storage devices such as a ROM (Read Only Memory) device and a RAM (Random Access Memory) device. Thus, the internal and peripheral components of the controller 50 are configured such that the controller 50 includes a preceding obstacle recognizing unit or section 51, a threshold value correcting unit or section 52, a risk potential calculating unit or section 53, and an accelerator pedal reaction force calculating unit or section 54. It will be apparent to those skilled in the art from this disclosure that the precise structure and algorithms for these units or sections 51 to 54 as well as other units or sections can be any combination of hardware and software that will carry out the functions of the present invention. Thus, "means plus function" clauses as utilized in the specification and claims should include any structure or hardware and/or algorithm or software that can be utilized to carry out the function of the "means plus function" clause.

The preceding obstacle recognizing unit 51 recognizes the preceding obstacle situation in the vicinity of the host vehicle based on detection values from the laser radar 10 and the host vehicle speed sensor 30. The threshold value correcting unit 52 calculates a threshold value for determining whether or not the vehicle driving assist system 1 should commence or end actuation reaction force control based on the preceding obstacle situation recognized by the preceding obstacle recognizing unit 51. Based on the threshold value calculated by the threshold value correcting unit 52 indicates and the preceding obstacle situation recognized by the preceding obstacle recognizing unit 51, the risk potential calculating unit 53 calculates risk a potential RP indicating the degree of convergence between the host vehicle and an obstacle. Based on the risk potential RP calculated by the risk potential calculating unit 53, the accelerator pedal reaction force calculating unit 54 calculates a control command value (reaction force control amount) for the accelerator pedal actuation reaction force.

Figure 4:
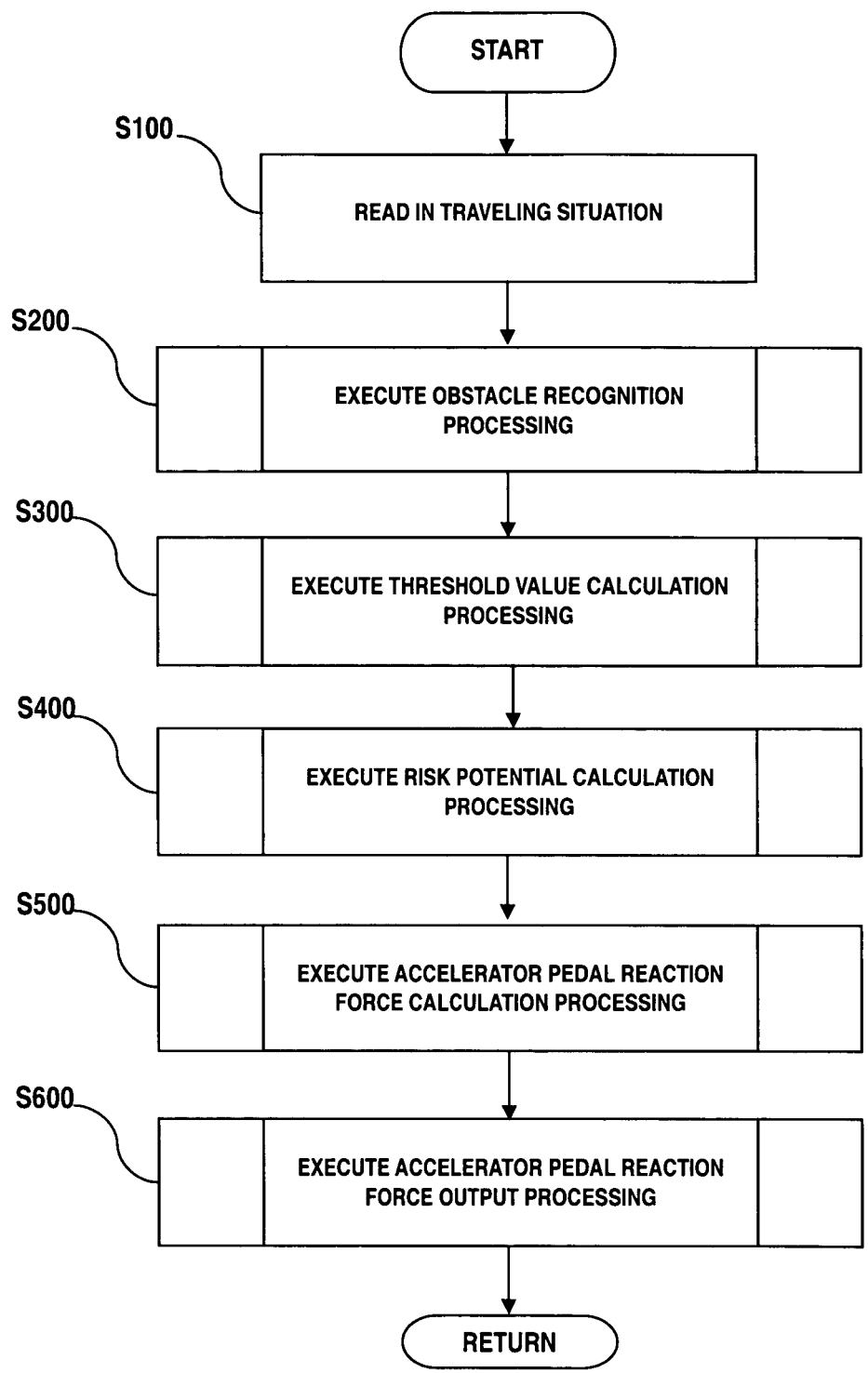
FIG. 4 is a flowchart showing the processing steps of a driving assistance control program in accordance with the first embodiment.

The operation of a vehicle driving assist system 1 in accordance with the first embodiment will now be explained with reference to FIG. 4. FIG. 4 is a flowchart showing the processing steps of the driving assistance control executed by the controller 50 in the first embodiment. This control loop is executed continuously once per prescribed time period, e.g., every 50 msec.

In step S100, the controller 50 reads in the traveling situation. The traveling situation mentioned here constitutes information related to the traveling circumstances of the host vehicle, including but not limited to information regarding preceding obstacles and the running state of the host vehicle. Thus, the controller 50 reads in a following distance X and existence direction to the preceding obstacle as detected by the laser radar 10, and the traveling speed Vh of the host vehicle as detected by the host vehicle speed sensor 30.

In step S200, the controller 50 recognizes the situation regarding the preceding obstacles based on the traveling situation data read in step S100. More specifically, the controller 50 recognizes the current relative position, movement direction and movement velocity of the preceding obstacle with respect to the host vehicle based on the current traveling situation data obtained in step S100 and based on relative position, movement direction, and movement velocity of the preceding obstacle with respect to the host vehicle that were detected during or prior to the previous control cycle and stored in the memory of the controller 50. The controller 50 then recognizes the manner in which the preceding obstacle is disposed in front of the host vehicle and the manner in which the preceding obstacle is moving relative to the movement of the host vehicle.

Figure 5:
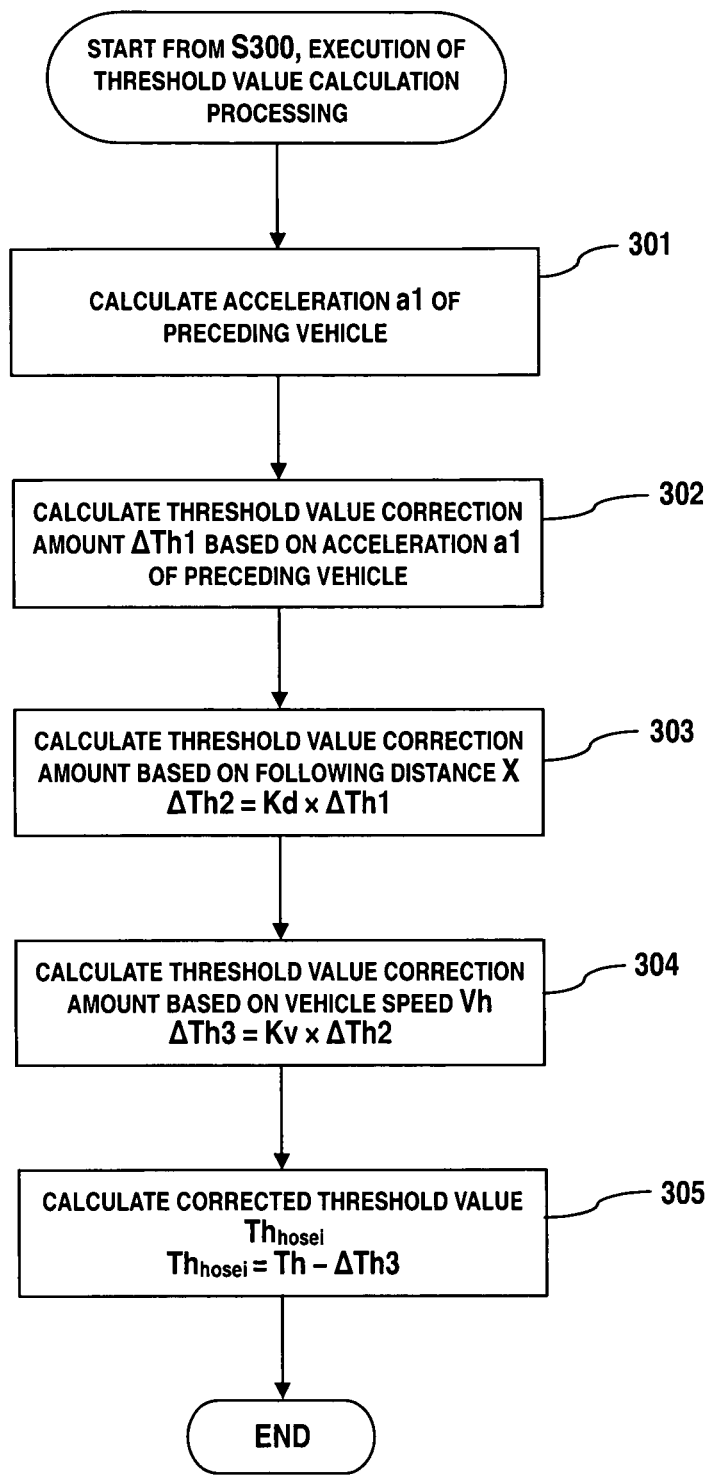
FIG. 5 is a flowchart for explaining the processing steps executed in order to calculate the threshold value.

In step S300, based on the preceding obstacle situation recognized in step S200, the controller 50 calculates a threshold value for determining whether or not to commence execution of actuation reaction force control in accordance with the risk potential RP. The threshold value is used for both starting the actuation reaction force control and for ending the actuation reaction force control. More specifically, the controller 50 calculates a corrected threshold value $Th_{hosei}$ by applying a correction (described later) to a preset initial or preliminary threshold value Th (e.g., 10 sec). The control processing executed in step S300 in order to calculate the corrected threshold value $Th_{hosei}$ will now be explained with reference to the flowchart of FIG. 5.

First, in step S301, the controller 50 calculates the acceleration a1 of the preceding obstacle, e.g., a preceding vehicle. The acceleration a1 of the preceding vehicle is calculated based on detection values from, for example, the laser radar 10 and the host vehicle speed sensor 30. If both vehicles are equipped with vehicle-to-vehicle communications, then the acceleration a1 can be acquired from the preceding vehicle via vehicle-to-vehicle communications.

Figure 6:
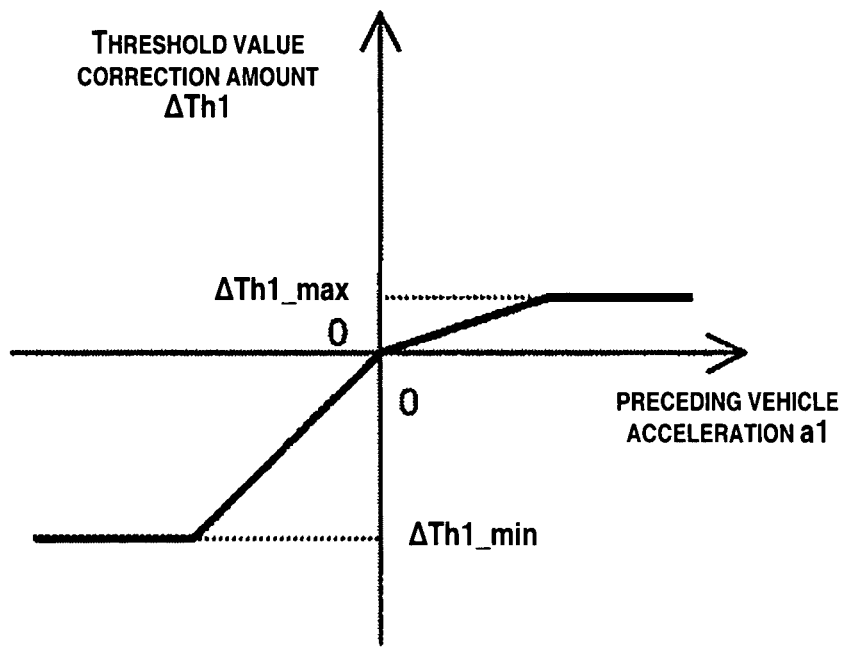
FIG. 6 is a plot of the threshold value correction amount versus the acceleration of the preceding vehicle.

In step S302, the controller 50 calculates a threshold value correction amount ΔTh1 based on the preceding vehicle acceleration a1 calculated in step S301. FIG. 6 is a plot of the threshold value correction amount ΔTh1 versus the acceleration a1 of the preceding vehicle. As shown in FIG. 6, the value of the threshold value correction amount ΔTh1 increases as the preceding vehicle acceleration a1 increases in the positive direction, i.e., as the acceleration of the preceding vehicle increases, and decreases as the preceding vehicle acceleration a1 increases in the negative direction, i.e., as the deceleration of the preceding vehicle increases. The maximum value ΔTh1_max of the threshold value correction amount ΔTh1 is, for example, 1 sec and the minimum value ΔTh1_min is, for example, −4 sec. For example, the relationship is set such that the threshold value correction amount ΔTh1 is −1 sec when the acceleration a1 of the preceding vehicle is a deceleration of 0.1G (1 m/s$^2$) and ¼ sec when the acceleration a1 is an acceleration of 0.1G.

If the preceding vehicle is accelerating, the threshold value correction amount ΔTh1 is set to a positive value and the threshold value is reduced. As a result, the actuation reaction force control is ended at an earlier time. The threshold value correction amount ΔTh1 curve is configured such that slope of the portion thereof corresponding to when the preceding vehicle is accelerating is smaller than the slope of the portion corresponding to when the preceding vehicle is decelerating in order to accommodate situations in which the preceding vehicle accelerates and then suddenly decelerates.

Figure 7:
FIG. 7 is a plot of the threshold value correction gain versus the following distance.

In step S303, the controller 50 calculates another threshold value correction amount ΔTh2 based on the following distance between the host vehicle in which the system 1 is installed and the preceding vehicle, which was read in step S100. In order to calculate the threshold value correction amount ΔTh2, the controller 50 first calculates a threshold value correction gain Kd based on the following distance X. FIG. 7 is a plot of the following distance dependent threshold value correction gain Kd versus the following distance X. As shown in FIG. 7, the correction coefficient Kd equals 0 when the following distance X is equal to or larger than a prescribed value X1 (e.g., X1=32 m) that is set to define a long following distance. As the following distance X decreases from the prescribed value X1, the correction gain Kd increases until the following distance X reaches a prescribed value X0 (e.g., X0=8 m) that is set to define a close following distance. When the following distance X is equal to or smaller than X0, the correction gain Kd equals a constant value Kd0 (e.g., Kd0=1).

Then, the threshold value correction amount ΔTh2 corresponding to the following distance X is calculated with Equation 1 shown below using the calculated correction gain Kd and the threshold value correction amount ΔTh1 calculated in step S302.

$$\Delta Th2 = Kd \times \Delta Th1 \quad \text{(Equation 1)}$$

With this equation, the threshold value Th is not corrected based on the acceleration a1 of the preceding vehicle when the preceding vehicle is far away from the host vehicle. Conversely, as the preceding vehicle approaches the host vehicle, the effect of the acceleration or deceleration of the preceding vehicle becomes larger. Therefore, the correction gain Kd is increased so that the threshold value correction amount ΔTh2 is increased.

Figure 8:
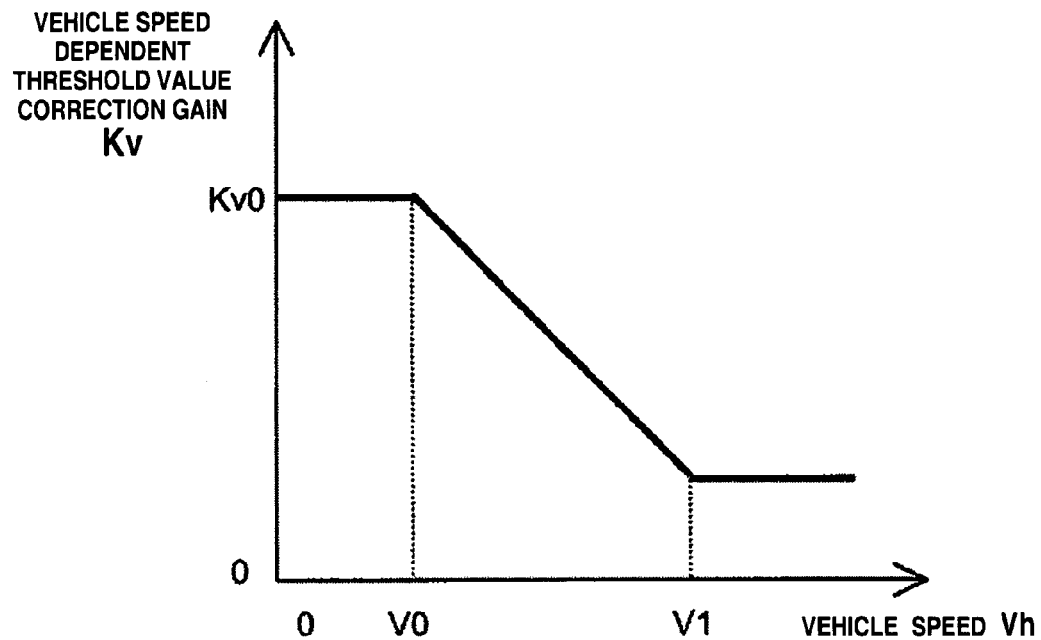
FIG. 8 is a plot of the threshold value correction gain versus the host vehicle speed.

In step S304, the controller 50 calculates another threshold value correction amount ΔTh3 based on the host vehicle speed Vh read in step S100. In order to calculate the threshold value correction amount ΔTh3, the controller 50 first calculates a threshold value correction gain Kv based on the host vehicle speed Vh. FIG. 8 is a plot of the threshold value correction gain Kv versus the host vehicle speed Vh. As shown in FIG. 8, the correction coefficient Kv is fixed (at, for example, 0.3) when the host vehicle speed Vh is equal to or larger than a prescribed value V1 (e.g., V1=60 km/h) that is set to define a high vehicle speed. As the host vehicle speed Vh decreases from the prescribed value V1, the correction gain Kv increases until the host vehicle speed Vh reaches a prescribed value V0 (e.g., V0=32 km/h) that is set to define a low vehicle speed. When the host vehicle speed Vh is equal to or smaller than V0, the correction gain Kv equals a value Kv0 (e.g., Kv0=2).

Then, the threshold value correction amount ΔTh3 corresponding to the host vehicle speed Vh is calculated with Equation 2 shown below using the calculated correction gain Kv and the threshold value correction amount ΔTh2 calculated in step S303.

$$\Delta Th3 = Kv \times \Delta Th2 \quad \text{(Equation 2)}$$

Generally speaking, the deceleration tends to be larger when the host vehicle is traveling a low speeds than when the host vehicle is traveling at high speeds. Meanwhile, the following distance X maintained by the host vehicle when it follows another vehicle tends to be shorter when traveling at low speeds than at high speeds. Therefore, as the traveling speed becomes the lower, the threshold value correction gain Kv is set to a larger value in order to cause the actuation reaction force control to commence at an earlier time.

In step 305, the controller 50A uses the threshold value correction amount ΔTh3 calculated in step S304 in Equation 3 shown below in order to calculate the corrected threshold value $Th_{hosei}$.

$$Th_{hosei} = Th - \Delta Th3 \quad \text{(Equation 3)}$$

With this equation, when the preceding vehicle is decelerating, the corrected threshold value $Th_{hosei}$ is calculated to be larger than the initial or preliminary threshold value Th in order to cause the actuation reaction force control to commence at an earlier time. Meanwhile, when the preceding vehicle is accelerating, the corrected threshold value $Th_{hosei}$ is calculated to be smaller than the initial or preliminary value Th in order to cause the actuation reaction force control to commence at a later time and end at an earlier time.

After the controller 50 calculates the corrected threshold value $Th_{hosei}$ in step S300, the controller 50 proceeds to step S400.

In step S400, the controller 50 calculates a risk potential RP indicating the degree of convergence between the host vehicle and the preceding obstacle. The term "risk potential" refers to the degree of risk or possibility of danger of a collision. In this embodiment, the risk potential is contrived to increase as the host vehicle and a preceding obstacle approaches the host vehicle. Thus, the risk potential is a physical quantity that expresses how close the host vehicle and the preceding obstacle are to each other, i.e., the degree to which the host vehicle and the preceding obstacle have approached each other (degree of convergence). The method of calculating the risk potential RP will now be described.

Figure 9:
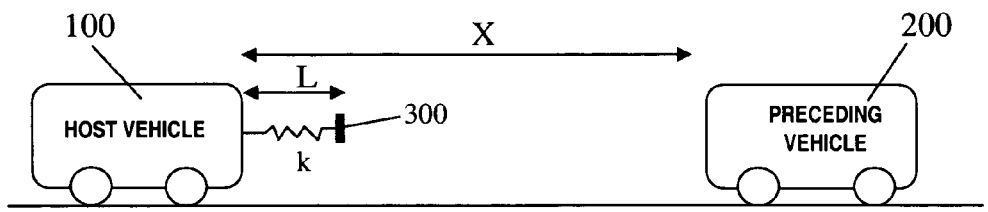
FIG. 9 is a pair of diagrams illustrating the concept of the risk potential of the host vehicle in which the driving assist system is installed.
Figure 9:
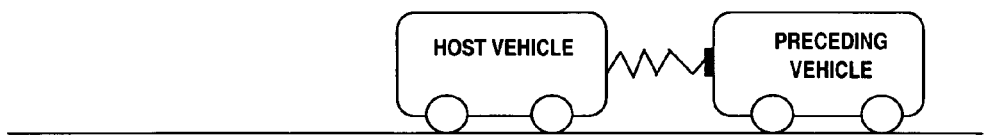
Figure 10:
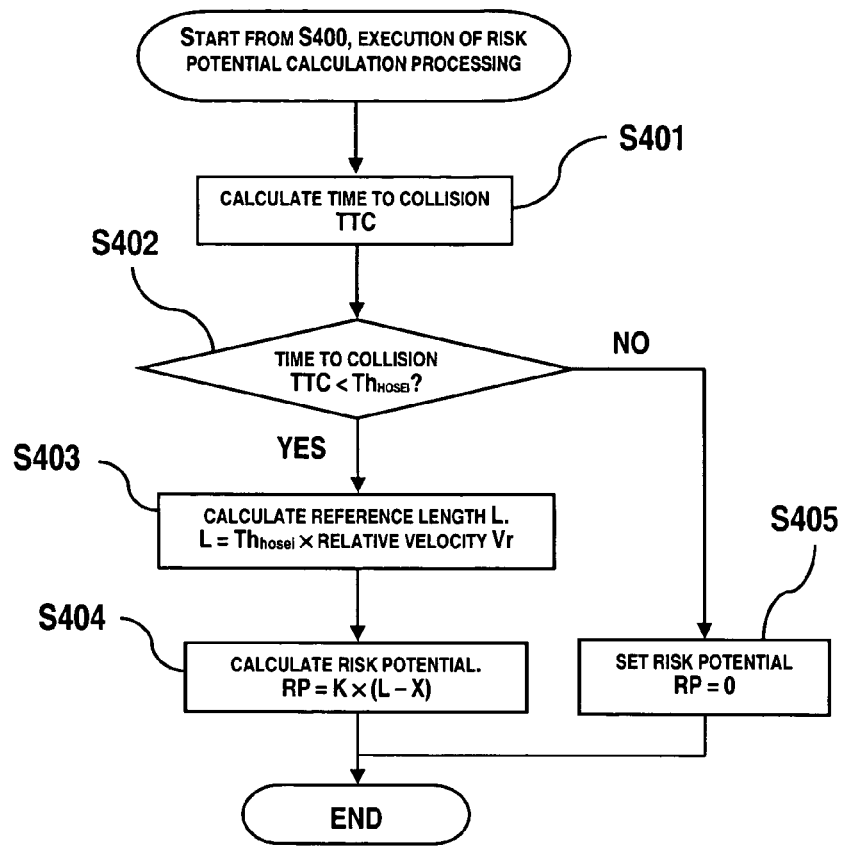
FIG. 10 is a flowchart for explaining the processing steps executed in order to calculate the risk potential.

Referring first to FIG. 9, two cases are schematically modeled to explain method of calculating the risk potential RP. Consider a model in which it is assumed that an imaginary elastic body 300 is provided on the front of the host vehicle 100 as shown in diagram (a) of FIG. 9. The imaginary elastic body 300 touches against the preceding vehicle 300 and is compressed, thereby generating a pseudo traveling resistance against the movement of the host vehicle 100. Here, the risk potential RP with respect to the preceding obstacle is defined to be the spring force that results when, as shown in diagram (b) of FIG. 9, the imaginary elastic body 300 contacts the preceding vehicle 200 and is compressed. The method of calculating the risk potential RP will now be explained with reference to the flowchart of FIG. 10.

In step S401, the controller 50 calculates the amount of time TTC (time to collision) until the host vehicle contacts the preceding vehicle recognized in front of the host vehicle in step S200. The time to collision TTC is a physical quantity indicating the current degree of convergence of the host vehicle with respect to the preceding vehicle. More specifically, the time to collision TTC is a value indicating the number of seconds until the following distance X becomes zero and the host vehicle contacts the preceding vehicle if the current traveling state continues, i.e., if the host vehicle speed Vh and the relative velocity Vr (=vehicle speed−speed of preceding vehicle) remain constant. The time to collision TTC with respect to the preceding vehicle is found using the Equation 4 shown below.

$$TTC = X/Vr \quad \text{(Equation 4)}$$

As the time to collision TTC becomes smaller, the collision with the preceding obstacle becomes more eminent and the degree of convergence with respect to the preceding obstacle becomes larger. For example, when approaching an obstacle, most drivers start taking action to decelerate before the time to collision TTC reaches 4 seconds or less. When an obstacle does not exist in front of the host vehicle, the time to collision TTC is infinity.

In step S402, the controller 50 determines if the time to collision TTC calculated in step S401 is smaller than the corrected threshold value $Th_{hosei}$ calculated in step S305. If the time to collision TTC is smaller than the corrected threshold value $Th_{hosei}$ (TTC<$Th_{hosei}$), then the controller 50 proceeds to step S403 and calculates a reference length L expressing the length of the imaginary elastic body 300. The reference length L is calculated using Equation 5 shown below based on the corrected threshold value $Th_{hosei}$ and the relative velocity Vr between the host vehicle and the preceding vehicle.

$$L = Th_{hosei} \times Vr \quad \text{(Equation 5)}$$

In step 404, the controller 50 uses the reference length L calculated in step S403 in Equation 6 shown below in order to calculate the risk potential RP of the host vehicle with respect to the preceding obstacle.

$$RP = K \times (L-X) \quad \text{(Equation 6)}$$

In the equation, the term K is the spring constant of the imaginary elastic member 300. Thus, the shorter the following distance X of the host vehicle with respect to the preceding obstacle becomes, the more the imaginary elastic body 300 is compressed and the risk potential RP increases.

If the result of step S402 is negative and the time to collision TTC is equal to or larger than $Th_{hosei}$, i.e., if the elastic body 300 is not contacting the preceding vehicle 200, as shown in diagram (a) of FIG. 9, the risk of contact between the host vehicle and the preceding vehicle is determined to be low and the controller 50 proceeds to step S405, where it sets the risk potential RP to 0.

Figure 11:
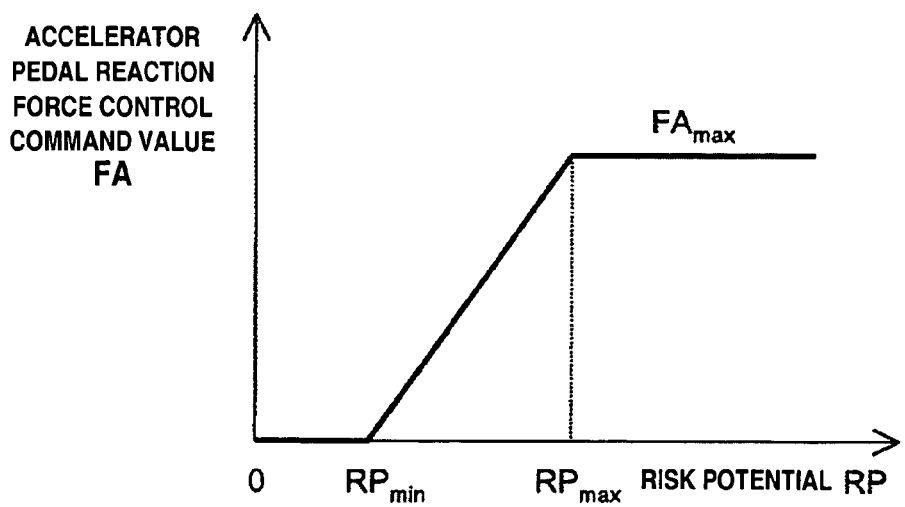
FIG. 11 is a plot of the accelerator pedal reaction force control amount versus the risk potential.

After the controller 50 calculates the risk potential RP in step S400, the controller 50 proceeds to step S500. In step S500, the controller 50 calculates a reaction force control command value FA for the actuation reaction force to be exerted by (generated in) the accelerator pedal 72 based on the risk potential RP calculated in step S400. FIG. 11 is a plot of the accelerator pedal reaction force control command value FA versus the risk potential RP. As indicated in FIG. 11, when the risk potential is larger than a prescribed minimum value RPmin, the accelerator pedal reaction force control command value FA is calculated such that the generated accelerator pedal reaction force increases as the risk potential RP increases. When the risk potential RP is larger than a prescribed maximum value RPmax, the accelerator pedal reaction force control command value FA is held constant at a maximum value FAmax such that a maximum accelerator pedal reaction force is generated.

In step S600, the controller 50 sends the accelerator pedal reaction force control command value FA calculated in step S500 to the accelerator pedal reaction force control device 70. The accelerator pedal reaction force control device 70 controls the actuation reaction force exerted by the accelerator pedal 72 based on the command value received from the controller 50. More specifically, the accelerator pedal 72 is made to exert an actuation reaction force equal to the sum of the reaction force control command value FA and a value obtained with a normal accelerator pedal reaction force characteristic set to be substantially proportional to the accelerator pedal actuation amount SA. After the command values are sent, the current control loop ends.

Figure 12:
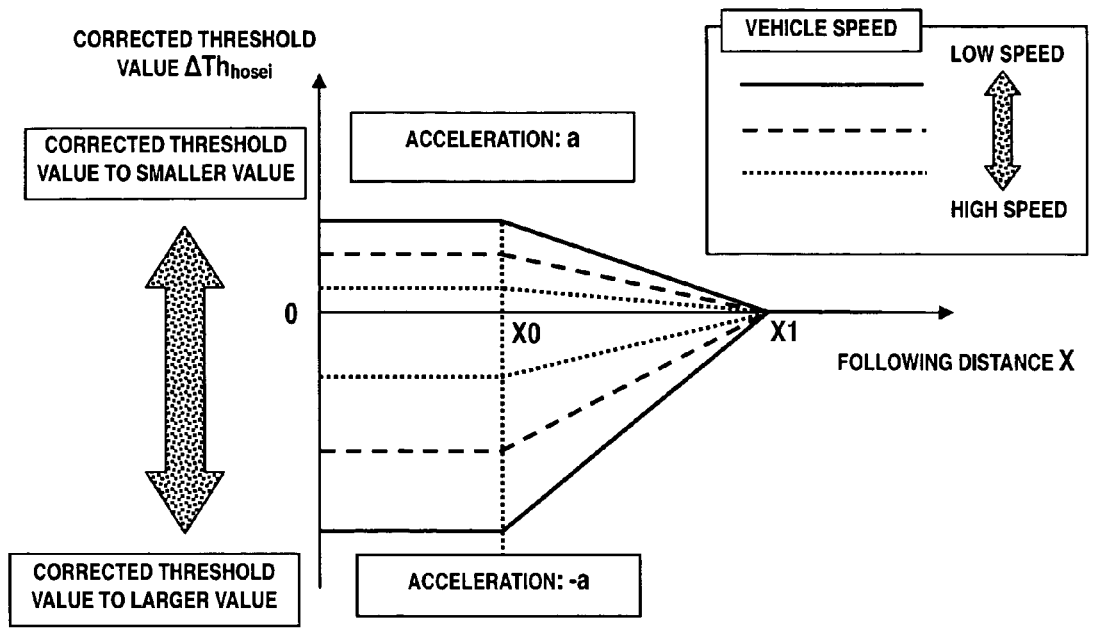
FIG. 12 is a plot of the corrected threshold value versus the following distance.
Figure 13:
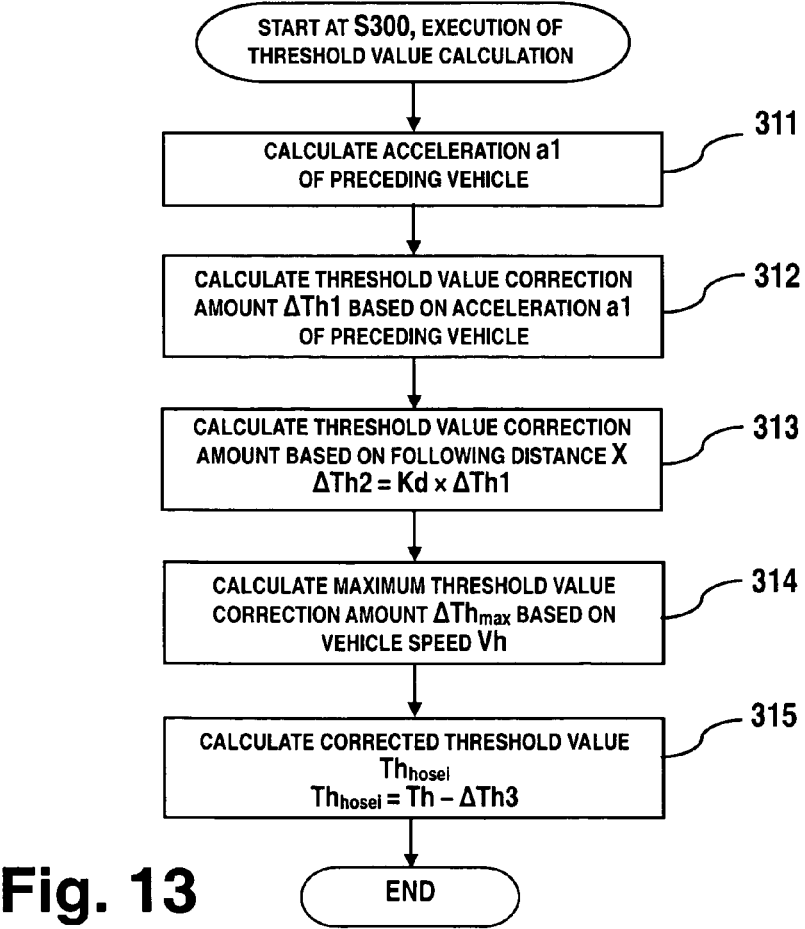
FIG. 13 is a flowchart showing the processing steps executed in order to calculate the threshold value in accordance with the second embodiment.
Figure 14:
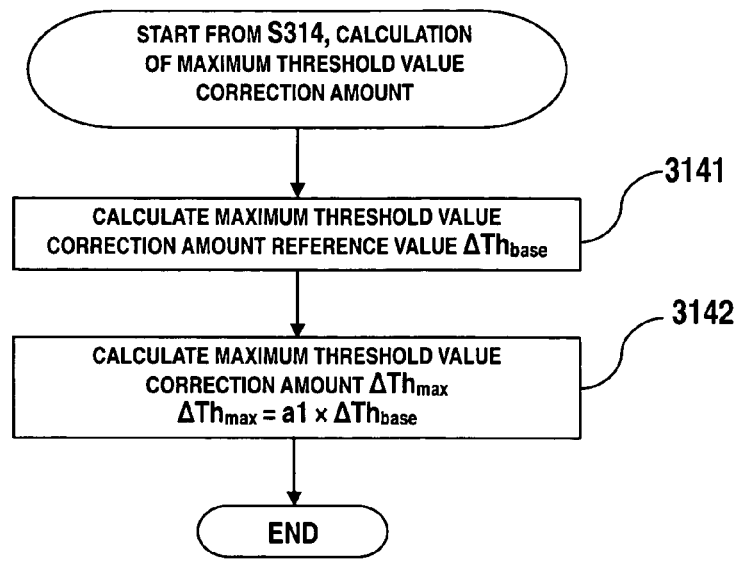
FIG. 14 is a flowchart for explaining the processing steps executed in order to calculate the maximum threshold value correction amount.

The operational effects of a vehicle driving assist system 1 in accordance with the first embodiment of the present invention will now be explained with reference to FIG. 12. FIG. 12 is a plot of the threshold value correction amount $\Delta Th_{hosei}$ and the following distance X between the host vehicle and the preceding obstacle. The threshold value correction amount $\Delta Th_{hosei}$ corresponds to the threshold value correction amount $\Delta Th3$ calculated in step S304. In FIG. 12, separate curves are shown for the threshold value correction amount $\Delta Th_{hosei}$ in order to facilitate explaining the relationship between $\Delta Th_{hosei}$ and the host vehicle speed Vh. A solid line illustrates a case in which the host vehicle speed Vh is low (Vh≤V0), a broken line illustrates a case in which the host vehicle speed Vh is medium (V0≤Vh≤V1), and a dotted line illustrates a case in which the host vehicle speed Vh is high (Vh≥V1). However, the threshold value correction amount $\Delta Th_{hosei}$ actually varies in a continuous fashion with respect to the host vehicle speed Vh.

When the threshold value correction amount $\Delta Th_{hosei}$ is a positive value, i.e., when the preceding vehicle is accelerating, the initial threshold value Th is corrected to a smaller value. Meanwhile, when the threshold value correction amount $\Delta Th_{hosei}$ is a negative value, i.e., when the preceding vehicle is decelerating, the initial threshold value Th is corrected to a larger value. Also, the threshold value correction amount $\Delta Th_{hosei}$ is set such that its absolute value becomes smaller as the following distance X increases and larger as the host vehicle speed Vh decreases. Furthermore, the threshold value Th is not corrected when the following distance X is equal to or larger than the prescribed value X1 and the size of the threshold value correction amount $\Delta Th_{hosei}$ is not changed with respect to changes in the following distance X when the following distance X is equal to or smaller than the prescribed value X0.

The first embodiment described heretofore can thus provide the following operational effects.

The vehicle driving assist system 1 detects at least the speed Vh of the host vehicle in which the system is installed and the following distance X of the host vehicle with respect to an obstacle existing in front of the host vehicle. Based on these detected quantities, the system 1 calculates a risk potential RP indicating the degree of convergence between the host vehicle and the preceding obstacle. Then, based on the calculated risk potential RP, the system 1 controls an actuation reaction force exerted by a driver-operated driving operation device of the host vehicle and/or a braking/driving force generated against the host vehicle. The controller 50 of the vehicle driving assist system 1 calculates the acceleration A1 of the preceding obstacle based on the detection results obtained from the laser radar 10 and the host vehicle speed sensor 20 (traveling situation detecting section). Then, based on the acceleration a1 of the preceding obstacle, the controller 50 (control section) corrects a threshold value Th used to determine whether or not the controller 50 should commence control of the actuation reaction force and/or the braking/driving force, thereby calculating a corrected control execution threshold value $Th_{hosei}$. The controller 50 calculates the risk potential RP in a manner that is dependent on the calculated corrected control execution threshold value $Th_{hosei}$. In the first embodiment, the controller 50 (control section) controls the actuation reaction force exerted by a driver-operated driving operation device. By calculating the corrected control execution threshold value $Th_{hosei}$ based on the acceleration a1 of the preceding obstacle, the times at which the actuation reaction force control is commenced and ended can be determined appropriately. In particular, since the risk imposed on the host vehicle by the preceding obstacle and the risk felt by the driver vary depending on whether the preceding obstacle is accelerating or decelerating, the necessary information regarding the risk potential RP can be conveyed without causing the driver to feel that there is something odd about the host vehicle by varying the corrected threshold value $Th_{hosei}$ in accordance with the acceleration a1 of the preceding obstacle.

The vehicle driving assist system 1 preferably includes the accelerator pedal reaction force calculating unit 54 that calculates an actuation reaction force to be exerted by (generated in) the accelerator pedal 72 based on the risk potential RP and the accelerator pedal reaction force control unit 70 that generates the calculated actuation reaction force in the accelerator pedal 72. As a result, by generating an actuation reaction force matched to the risk potential RP in the accelerator pedal 72 (driver-operated driving operation device), the risk potential RP can be conveyed to the driver in an intuitive manner.

The threshold value correcting unit 52 of the controller 50 is configured to calculate a corrected control execution threshold value $Th_{hosei}$ such that the initial or preliminary threshold value Th is decreased when the acceleration a1 of the preceding obstacle is a positive value and increased when the acceleration a1 of the preceding obstacle is a negative value. Thus, the threshold value Th is reduced and the actuation reaction force control is commenced or started later and ended at an earlier time when the preceding obstacle is accelerating. Conversely, the threshold value Th is increased and the actuation reaction force control is commenced at an earlier time when the preceding obstacle is decelerating. As a result, an appropriate risk potential can be conveyed.

The threshold value correcting unit 52 preferably corrects the threshold value Th based on both the following distance X and the acceleration a1 of the preceding obstacle in such a fashion that the correction amount $\Delta Th3$ by which the threshold value Th is corrected to obtain the corrected control execution threshold value $Th_{hosei}$ is reduced as the following distance X increases. More specifically, as shown in FIG. 7, the correction gain Kd is gradually reduced as the following distance X increases from the prescribed value X0. When the preceding obstacle is far, the effect on the host vehicle of changes in the acceleration a1 of the preceding obstacle is small and, thus, stable control can be accomplished by reducing the amount by which the threshold value Th is corrected.

The threshold value correcting unit 52 preferably corrects the threshold value Th based on both the host vehicle speed Vh and the acceleration a1 of the preceding obstacle in such a fashion that the correction amount $\Delta Th3$ by which the threshold value Th is corrected to obtain the corrected control execution threshold value $Th_{hosei}$ is reduced as the following distance X increases. More specifically, as shown in FIG. 8, the correction gain Kv is gradually reduced as the host vehicle speed Vh increases from the prescribed value V0. When the host vehicle is traveling at a low speed, the change in the deceleration tends to be larger and the following distance X with respect to the preceding vehicle tends to be smaller than when the host vehicle is traveling at a high speed. Therefore, the actuation reaction force control can be commenced at an earlier time in cases where the preceding obstacle is decelerating by configuring the threshold correcting unit 52 to increase the correction gain Kv as the host vehicle speed Vh decreases.

The threshold correcting unit 52 sets the correction amount $\Delta Th3$ used to obtain the corrected control execution threshold value $Th_{hosei}$ to approximately 0 when the following distance X is equal to or larger than a first prescribed value X1 serving to define when the preceding obstacle is far from the host vehicle and to hold the correction amount $\Delta Th3$ used to obtain the corrected control execution threshold value $Th_{hosei}$ at a fixed value when the following distance is equal to or smaller than a second prescribed value X0 serving to define when the preceding obstacle is close to the host vehicle. As a result, stable control can be accomplished by using the threshold value Th as is when the preceding obstacle is far away from the host vehicle and the acceleration a1 of the preceding obstacle has little effect on the host vehicle and holding the correction amount $\Delta Th3$ of the threshold value Th at a fixed value when the preceding obstacle is close to the host vehicle, i.e., within a prescribed range.

The threshold value correcting unit 52 of the controller 50 calculates the corrected control execution threshold value $Th_{hosei}$ by correcting the threshold value Th based on the acceleration a1 of the preceding obstacle, the following distance X, and the host vehicle speed Vh. As a result, an appropriate corrected threshold value $Th_{hosei}$ can be set in consideration the particular traveling situation in which the acceleration a1 of the preceding obstacle will affect the host vehicle. More specifically, the host vehicle is more readily affected by the acceleration a1 of the preceding obstacle when the host vehicle is traveling at a low speed and less readily affected by the acceleration a1 of the preceding obstacle when the preceding obstacle is far away from the host vehicle. By calculating the threshold value correction amount $\Delta Th_{hosei}$ as shown in FIG. 12 in view of these relationships, the actuation reaction force can be commenced at an appropriate time such that the control does not cause the driver to have a feeling that there is something odd about the host vehicle.

The controller 50 is further configured to detect the relative velocity Vr between the host vehicle and the preceding obstacle as part of the traveling situation. The risk potential calculating unit 53 calculates the risk potential RP using the time to collision TTC between the host vehicle and the preceding obstacle. The time to collision TTC is calculated by dividing the following distance X by the relative velocity Vr. When the time to collision TTC is smaller than the corrected control execution threshold value $Th_{hosei}$ the actuation reaction force control is commenced. When the time to collision TTC is equal to or larger than the corrected control execution threshold value $Th_{hosei}$, the risk potential RP is set to 0. Thus, as the corrected threshold value $Th_{hosei}$ increases, the risk potential RP becomes more likely to be calculated and the actuation reaction force control is commenced at an earlier time. Conversely, as the corrected threshold value $Th_{hosei}$ decreases, the risk potential RP becomes less likely to be calculated and the actuation reaction force control is started at a later time and ended at an earlier time. By setting the corrected threshold value $Th_{hosei}$ appropriately, the timing at which the actuation reaction force control is commenced and the timing at which the actuation reaction force control is ended can be adjusted so as to achieve an effective control.

Second Embodiment

Referring now to FIGS. 13 to 17, a vehicle driving assist system in accordance with a second embodiment will now be explained. The basic constituent features of a vehicle driving assist system in accordance with the second embodiment are the same as those of the first embodiment shown in FIGS. 1 and 2. In view of the similarity between the first and second embodiments, the descriptions of the parts of the second embodiment that are identical to the parts of the first embodiment will be omitted for the sake of brevity.

In the second embodiment, the maximum value of the corrected threshold value $\Delta Th_{hosei}$ is restricted by the host vehicle speed Vh. The processing operations for calculating the threshold value in the second embodiment will now be explained with reference to the flowchart of FIG. 13. These processing operations are executed in step S300 of the flowchart shown in FIG. 4. The processing of the steps S311 to S313 is the same as in steps S301 to S303 of the flowchart shown in FIG. 5, and thus explanations of these steps are omitted for the sake of brevity.

Figure 15:
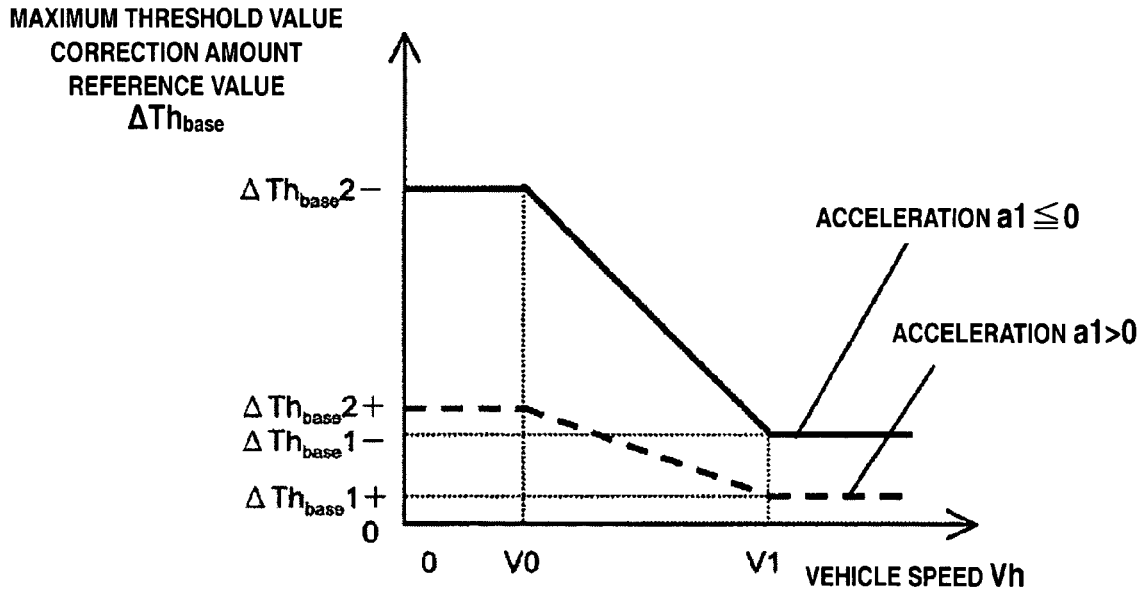
FIG. 15 is a plot of the maximum threshold value correction amount versus the host vehicle speed.
Figure 16:
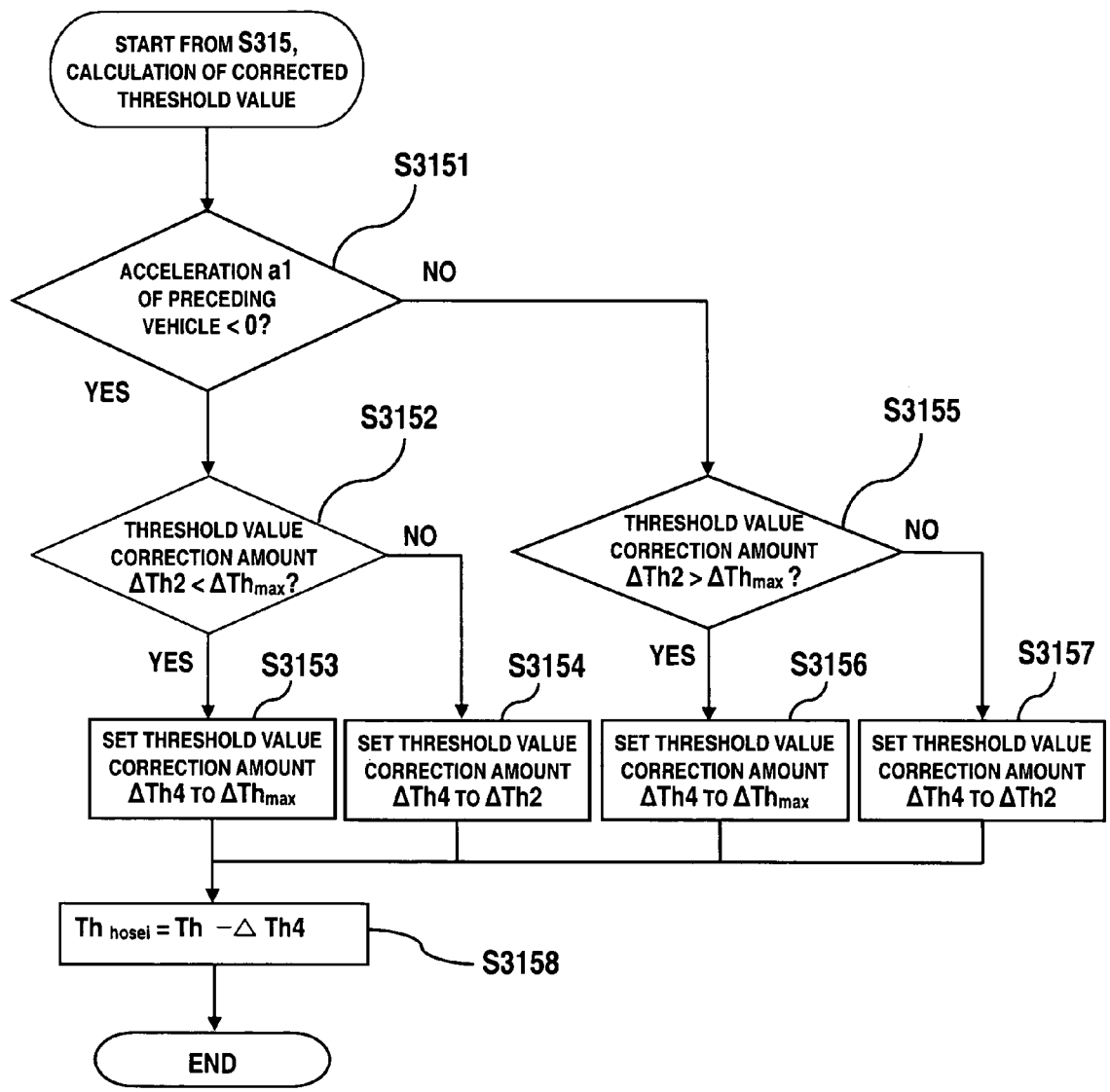
FIG. 16 is a flowchart for explaining the processing steps executed in order to calculate the corrected threshold value.

In step S314, a maximum threshold value correction amount $\Delta Th_{max}$ is calculated based on the host vehicle speed Vh. The control processing executed in order to calculate the maximum threshold value correction amount $\Delta Th_{max}$ will now be explained with reference to the flowchart of FIG. 14. First, in step S3141, the controller 50 calculates a reference value $\Delta Th_{base}$ to be used for calculating the maximum correction amount $\Delta Th_{max}$. FIG. 15 is a plot of the maximum threshold value correction amount reference value $\Delta Th_{base}$ versus the host vehicle speed Vh. In FIG. 15, the broken-line curve illustrates a case in which the acceleration a1 of the preceding vehicle is larger than 0, i.e., the preceding vehicle is accelerating, and the solid-line curve illustrates a case in which the acceleration a1 of the preceding vehicle a1 is equal to or less than 0, i.e., the preceding vehicle is moving at a constant speed or decelerating.

When the preceding vehicle is decelerating and the host vehicle speed Vh is equal to or larger than a prescribed value V1 (e.g., V1=60 km/h), the reference value $\Delta Th_{base}$ is held at a constant value $\Delta Th_{base}1$-(e.g., $\Delta Th_{base}1$ -=0.3 sec). As the host vehicle speed Vh decreases from V1, the reference value $\Delta Th_{base}$ increases gradually until the host vehicle speed Vh reaches a prescribed value V0 (e.g., V0=32 km/h). When the host vehicle speed is equal to or smaller than the prescribed value V0, the reference value $\Delta Th_{base}$ is held at a fixed value $\Delta Th_{base}2$-(e.g., $\Delta Th_{base}2$-=1 sec).

When the preceding vehicle is accelerating and the host vehicle speed Vh is equal to or larger than a prescribed value V1 (e.g., V1=60 km/h), the reference value $\Delta Th_{base}$ is held at a constant value $\Delta Th_{base}1$+(e.g., $\Delta Th_{base}1$ +=0.1 sec). As the host vehicle speed Vh decreases from V1, the reference value $\Delta Th_{base}$ increases gradually until the host vehicle speed Vh reaches a prescribed value V0 (e.g., V0=32 km/h). When the host vehicle speed is equal to or smaller than the prescribed value V0, the reference value $\Delta Th_{base}$ is held at a fixed value $\Delta Th_{base}2$+(e.g., $\Delta Th_{base}2$ +=0.25 sec).

In step 3142, the controller 50 uses the acceleration a1 of the preceding vehicle and the maximum threshold value correction amount reference value $\Delta Th_{base}$ calculated in step S3141 in the Equation 7 shown below in order to calculate the maximum threshold value correction amount $\Delta Th_{max}$.

$$\Delta Th_{max} = a1 \times \Delta Th_{base} \quad \text{(Equation 7)}$$

After calculating the maximum threshold value correction amount $\Delta Th_{max}$ in step S314, the controller 50 proceeds to step S315 and calculates the corrected threshold value $Th_{hosei}$. The control processing executed in order to calculate the corrected threshold value $Th_{hosei}$ will now be explained with reference to the flowchart of FIG. 16.

In step S3151, the controller 50 determines if the acceleration a1 of the preceding vehicle is smaller than 0. If the acceleration a1 is less than 0, i.e., if the preceding vehicle is decelerating, the controller 50 proceeds to step S3152 and determines if the threshold value correction amount $\Delta Th2$ is smaller than the maximum threshold value correction amount $\Delta Th_{max}$. If the threshold value correction amount $\Delta Th2$ is smaller than the maximum threshold value correction amount $\Delta Th_{max}$, then the controller 50 proceeds to step S3153 and sets the maximum correction amount $\Delta Th_{max}$ as the value of another threshold value correction amount $\Delta Th4$. If threshold value correction amount $\Delta Th2$ is equal to or larger than the maximum threshold value correction amount $\Delta Th_{max}$, the controller 50 proceeds to step S3154 and sets the correction amount $\Delta Th2$ as the value of the threshold value correction amount $\Delta Th4$.

If the result of step S3151 is negative, i.e., if the preceding vehicle is moving at a constant speed or accelerating, the controller 50 proceeds to step S3155. In step S3155, the controller 50 determines if the threshold value correction amount $\Delta Th2$ is larger than the maximum threshold value correction amount $\Delta Th_{max}$. If threshold value correction amount $\Delta Th2$ is larger than $\Delta Th_{max}$, the controller 50 proceeds to step S3156 and sets the maximum correction amount $\Delta Th_{max}$ as the value of the threshold value correction amount $\Delta Th4$. If threshold value correction amount $\Delta Th2$ is equal to or smaller than the maximum threshold value correction amount $\Delta Th_{max}$, then the controller 50 proceeds to step S3157 and sets the threshold value correction amount $\Delta Th2$ as the value of the threshold value correction amount $\Delta Th4$.

In step 3158, the controller 50 uses the threshold value correction amount $\Delta Th4$ calculated in step S3157 in Equation 8 shown below in order to calculate the corrected threshold value $Th_{hosei}$.

$$Th_{hosei} = Th - \Delta Th4 \quad \text{(Equation 8)}$$

After the controller 50 calculates the corrected threshold value $Th_{hosei}$ in step S300, the controller 50 proceeds to step S400 and calculates the risk potential RP.

Figure 17:
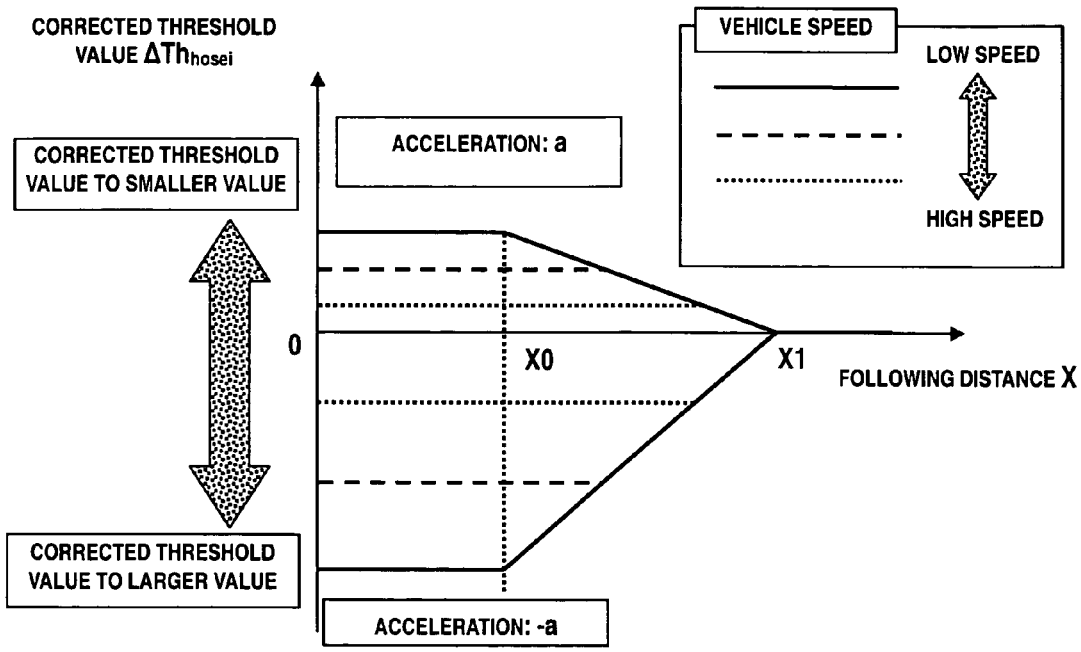
FIG. 17 is a plot of the corrected threshold value versus the following distance.
Figure 18:
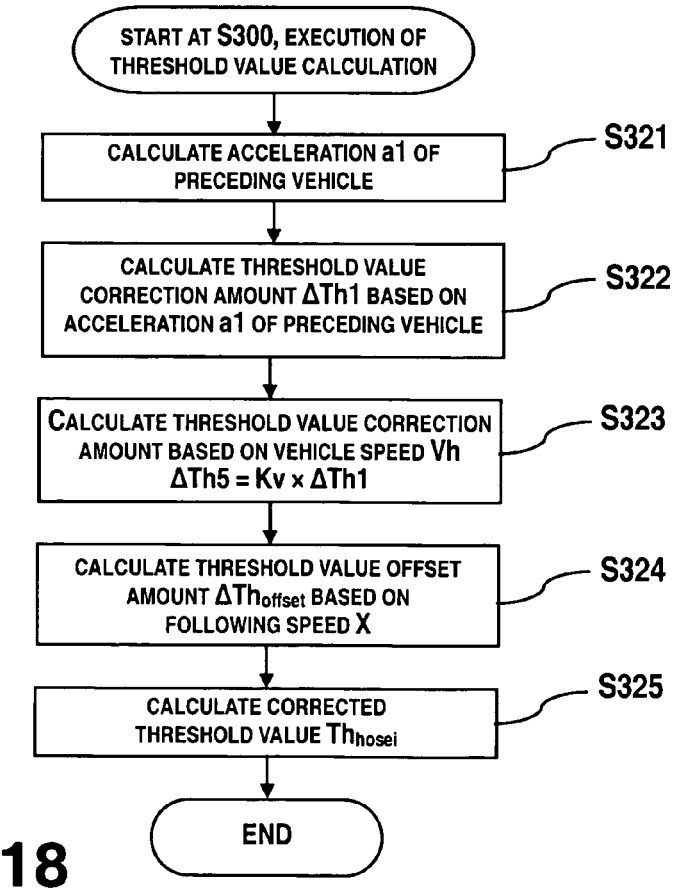
FIG. 18 is a flowchart showing the processing steps executed in order to calculate the threshold value in accordance with the third embodiment.
Figure 19:
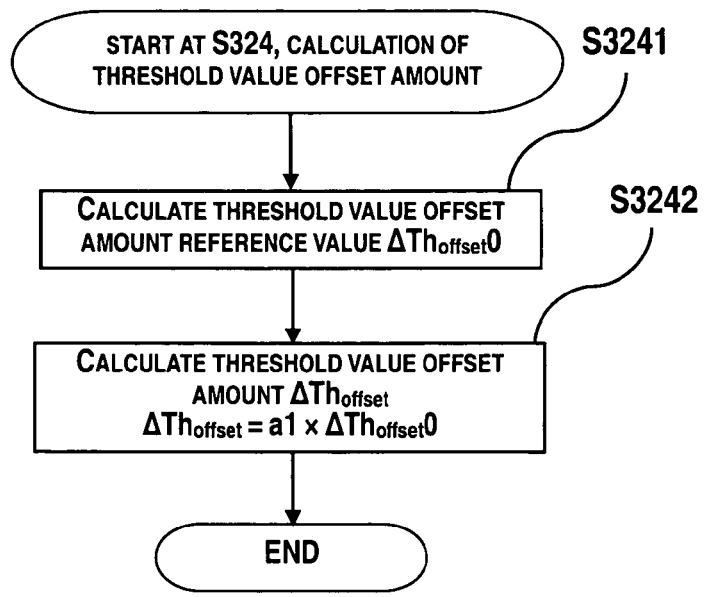
FIG. 19 is a flowchart for explaining the processing steps executed in order to calculate the threshold value offset amount.

The operational effects of a vehicle driving assist system 1 in accordance with the second embodiment of the present invention will now be explained with reference to FIG. 17. FIG. 17 is a plot of the threshold value correction amount $\Delta Th_{hosei}$ and the following distance X between the host vehicle and the preceding obstacle. The threshold value correction amount $\Delta Th_{hosei}$ corresponds to the threshold value correction amount $\Delta Th4$ calculated in the flowchart of FIG. 16. In FIG. 17, separate curves are shown for the threshold value correction amount $\Delta Th_{hosei}$ in order to facilitate explaining the relationship between $\Delta Th_{hosei}$ and the host vehicle speed Vh. A solid line illustrates a case in which the host vehicle speed Vh is low (Vh≤V0), a broken line illustrates a case in which the host vehicle speed Vh is medium (V0≤Vh≤V1), and a dotted line illustrates a case in which the host vehicle speed Vh is high (Vh≥V1). However, the threshold value correction amount $\Delta Th_{hosei}$ actually varies in a continuous fashion with respect to the host vehicle speed Vh.

When the threshold value correction amount $\Delta Th_{hosei}$ is a positive value, i.e., when the preceding vehicle is accelerating, the initial threshold value Th is corrected to a smaller value. Meanwhile, when the threshold value correction amount $\Delta Th_{hosei}$ is a negative value, i.e., when the preceding vehicle is decelerating, the initial threshold value Th is corrected to a larger value. Since a maximum correction amount $\Delta Th_{max}$ based on the host vehicle speed Vh is set as the upper limit of the threshold value correction amount $\Delta Th_{hosei}$, the threshold value correction amount $\Delta Th_{hosei}$ will not decline in the manner of the first embodiment when the following distance X increases. As a result, the actuation reaction force control can be commenced and ended at appropriate times even when the preceding vehicle is far away. When the following distance X is equal to or larger than a prescribed value X1, the controller 50 does not correct the threshold value Th.

The second embodiment just described can provide the following operational effects in addition to the effects provided by the first embodiment.

In the second embodiment, the threshold value correcting unit 52 of the controller 50 gives priority to the correction of the threshold value Th based on the traveling distance X over the correction based on the host vehicle speed Vh. More specifically, after it calculates the threshold value correction amount $\Delta Th2$ based on the following distance X, the threshold value correcting unit 52 calculates the maximum threshold value correction amount $\Delta Th_{max}$ based on the host vehicle speed Vh and limits the threshold value correction amount $\Delta Th2$. As a result, the threshold value correction amount $\Delta Th_{hosei}$ is calculated as illustrated in FIG. 17 such that the actuation reaction force control start timing can be adjusted appropriately and a reliable control effect can be obtained even when the following distance X is large. In particular, the threshold value Th is corrected to a larger value when the host vehicle speed is low and the preceding vehicle is decelerating rapidly.

Third Embodiment

Referring now to FIGS. 18 to 22, a vehicle driving assist system in accordance with a third embodiment will now be explained. The basic constituent features of the vehicle driving assist system in accordance with the third embodiment are the same as those of the first embodiment shown in FIGS. 1 and 2. In view of the similarity between the first and third embodiments, the descriptions of the parts of the third embodiment that are identical to the parts of the first embodiment will be omitted for the sake of brevity.

In the third embodiment, a threshold value offset amount is calculated based on the following distance X after the threshold value correction gain Kv is set based on the host vehicle speed Vh. The processing operations for calculating the threshold value in the third embodiment will now be explained with reference to the flowchart of FIG. 18. These processing operations are executed in step S300 of the flowchart shown in FIG. 4. The processing of the steps S321 and S322 is the same as in steps S301 and S302 of the flowchart shown in FIG. 5 and explanations of these steps are omitted for the sake of brevity.

In step S323, the controller 50 calculates the threshold value correction gain Kv based on the host vehicle speed Vh using the steps shown in FIG. 8 and then calculates a threshold value correction amount $\Delta Th5$ using the Equation 9 shown below.

$$\Delta Th5 = Kv \times \Delta Th1 \qquad \text{(Equation 9)}$$

Then, in step S324, the controller calculates a threshold value offset amount $\Delta Th_{offset}$ based on the following distance X. The control processing executed in order to calculate the threshold value offset amount $\Delta Th_{offset}$ will now be explained with reference to the flowchart of FIG. 19.

Figure 20:
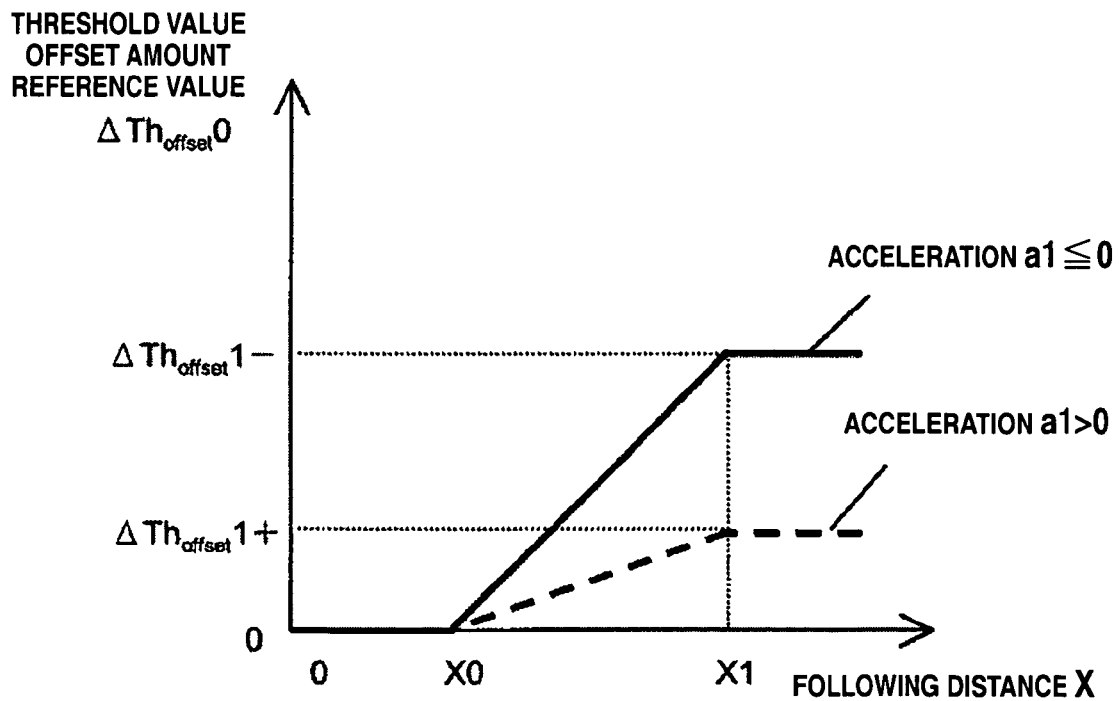
FIG. 20 is a plot of the threshold value offset amount reference value versus the following distance.
Figure 21:
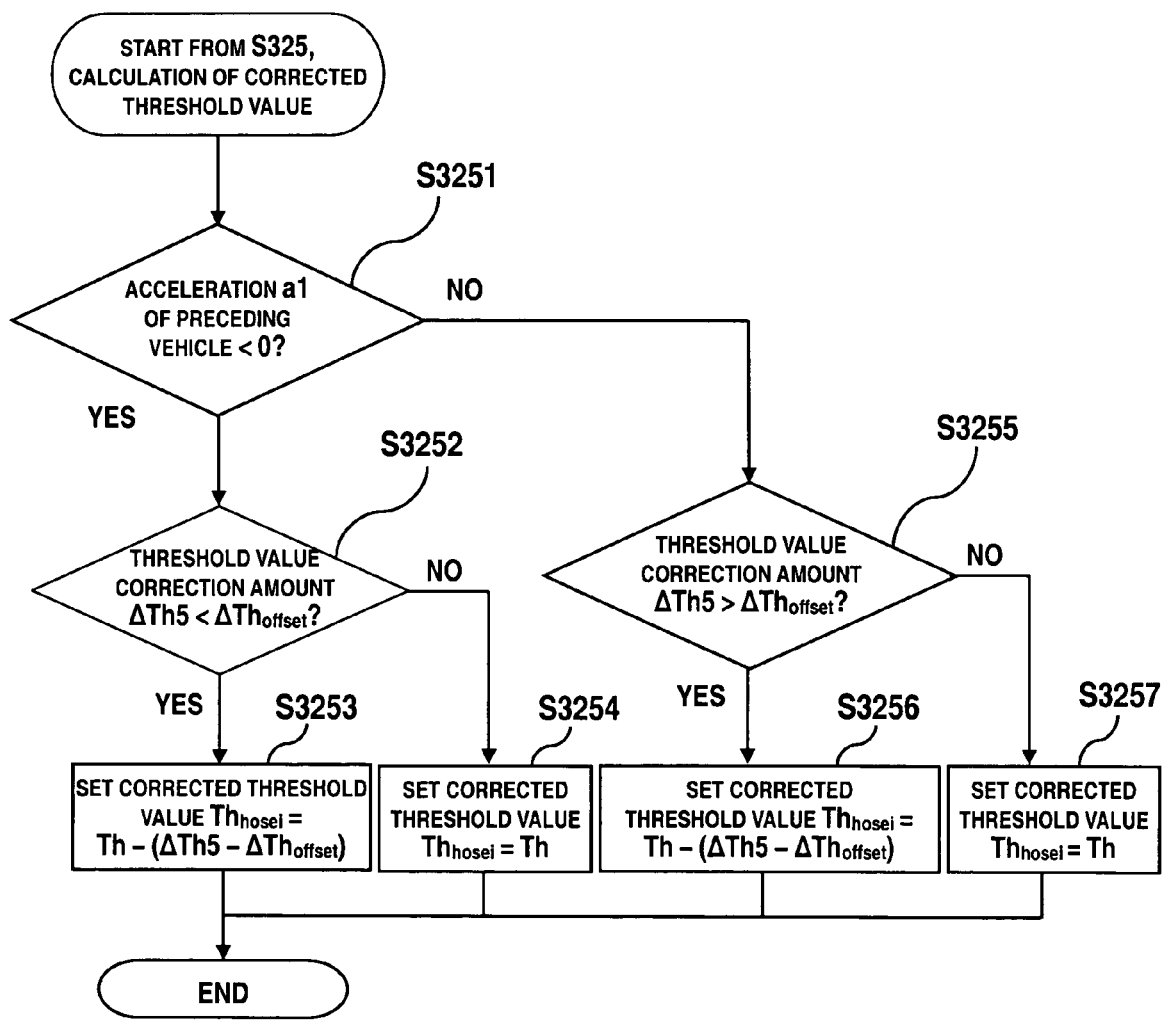
FIG. 21 is a flowchart for explaining the processing steps executed in order to calculate the corrected threshold value.

First, in step S3241, the controller 50 calculates a reference value $\Delta Th_{offset}0$ based on the following distance X for calculating the threshold value offset amount $\Delta Th_{offset}$. FIG. 20 is a plot of the threshold value offset amount reference value $\Delta Th_{offset}0$ versus the following distance X. In FIG. 20, the broken-line curve illustrates a case in which the acceleration a1 of the preceding vehicle is larger than 0, i.e., the preceding vehicle is accelerating, and the solid-line curve illustrates a case in which the acceleration a1 of the preceding vehicle is equal to or less than 0, i.e., the preceding vehicle is moving at a constant speed or decelerating.

When the preceding vehicle is decelerating and the following distance X is equal to or larger than a prescribed value X1 (e.g., X1=32 m), the reference value $\Delta Th_{offset}0$ is held at a constant value $\Delta Th_{offset}1-$ (e.g., $\Delta Th_{offset}1-=1$ sec). The reference value $\Delta Th_{offset}0$ decreases gradually as the following distance X decreases from X1 and is set to 0 when the following distance X is equal to or below the prescribed value X0 (e.g., X0=8 m).

When the preceding vehicle is decelerating and the following distance X is equal to or larger than a prescribed value X1 (e.g., X1=32 m), the reference value $\Delta Th_{offset}0$ is held at a constant value $\Delta Th_{offset}1+$ (e.g., $\Delta Th_{offset}1+=0.25$ sec). The reference value $\Delta Th_{offset}0$ decreases gradually as the following distance X decreases from X1 and is set to 0 when the following distance X is equal to or below the prescribed value X0 (e.g., X0=8 m).

In step 3242, the controller 50 calculates the threshold value offset amount $\Delta Th_{offset}$ based on the acceleration a1 of the preceding vehicle and the threshold value offset amount reference value $\Delta Th_{offset}0$ calculated in step S3241, and using the Equation 10 shown below.

$$\Delta Th_{offset} = a1 \times \Delta Th_{offset}0 \qquad \text{(Equation 10)}$$

After calculating the threshold value offset amount $\Delta Th_{offset}$ in step S324, the controller 50 proceeds to step S325 and calculates the corrected threshold value $Th_{hosei}$. The control processing executed in order to calculate the corrected threshold value $Th_{hosei}$ will now be explained with reference to the flowchart of FIG. 21.

In step S3251, the controller 50 determines if the acceleration a1 of the preceding vehicle is smaller than 0. If the acceleration a1 is less than 0, i.e., if the preceding vehicle is decelerating, then the controller 50 proceeds to step S3252 and determines if the threshold value correction amount $\Delta Th5$ is smaller than the threshold value offset amount $\Delta Th_{offset}$. If the threshold value correction amount $\Delta Th5$ is smaller than the threshold value offset amount $\Delta Th_{offset}$, then the controller 50 proceeds to step S3253 and calculates the corrected threshold value $Th_{hosei}$ using the Equation 11 shown below.

$$Th_{hosei} = Th - (\Delta Th5 - \Delta Th_{offset}) \qquad \text{(Equation 11)}$$

If the threshold value correction amount $\Delta Th5$ is equal to or larger than the threshold value offset amount $\Delta Th_{offset}$, then the controller 50 proceeds to step S3254 and sets the value of the corrected threshold value $Th_{hosei}$ to Th ($Th_{hosei}$=Th).

If the result of step S3251 is negative, i.e., if the preceding vehicle is moving at a constant speed or accelerating, then the controller 50 proceeds to step S3255. In step S3255, the controller 50 determines if the threshold value correction amount $\Delta Th5$ is larger than the threshold value offset amount $\Delta Th_{offset}$. If the threshold value correction amount $\Delta Th5$ is larger than the threshold value offset amount $\Delta Th_{offset}$, then the controller 50 proceeds to step S3256 and calculates the corrected threshold value $Th_{hosei}$ using the Equation 11 mentioned previously. If the threshold value correction amount $\Delta Th5$ is equal to or smaller than $\Delta Th_{offset}$, then the controller 50 proceeds to step S3257 and sets the value of the corrected threshold value $Th_{hosei}$ to Th ($Th_{hosei}$=Th).

After the controller 50 calculates the corrected threshold value $Th_{hosei}$ in step S300, the controller 50 proceeds to step S400 and calculates the risk potential RP.

Figure 22:
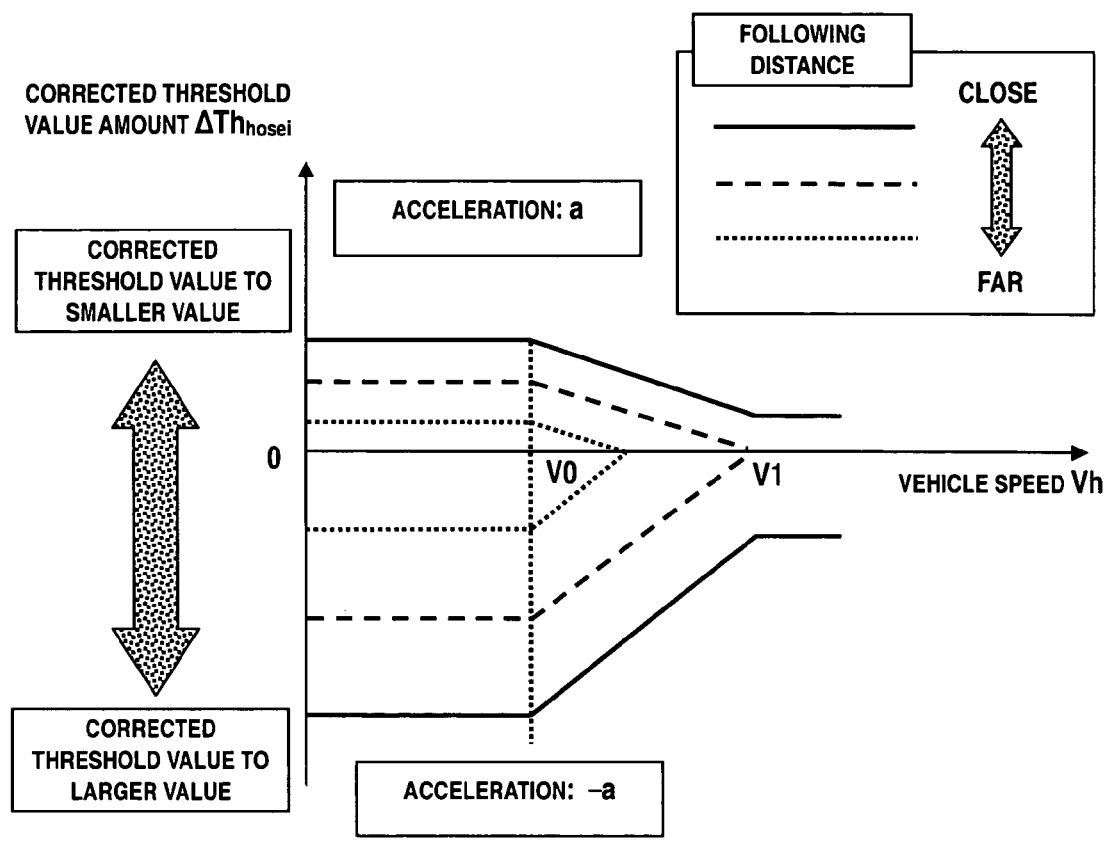
FIG. 22 is a plot of the corrected threshold value versus the host vehicle speed.

The operational effects of a vehicle driving assist system 1 in accordance with the third embodiment of the present invention will now be explained with reference to FIG. 22. FIG. 22 is a plot of the threshold value correction amount $\Delta Th_{hosei}$ versus the host vehicle speed Vh. The threshold value correction amount $\Delta Th_{hosei}$ corresponds to the threshold value correction amount ($\Delta Th5 - \Delta Th_{offset}$) calculated in the flowchart of FIG. 21. In FIG. 22, separate curves are shown for the threshold value correction amount $\Delta Th_{hosei}$ in order to facilitate explaining the relationship between $\Delta Th_{hosei}$ and the following distance X. A solid line illustrates a case in which the following distance X is low ($X \leq X0$), a broken line illustrates a case in which the following distance X is medium ($X0 \leq X \leq X1$), and a dotted line illustrates a case in which the following distance X is high ($X \geq X1$). However, the threshold value correction amount $\Delta Th_{hosei}$ actually varies in a continuous fashion with respect to the following distance X.

When the threshold value correction amount $\Delta Th_{hosei}$ is a positive value, i.e., when the preceding vehicle is accelerating, the initial threshold value Th is corrected to a smaller value. Meanwhile, when the threshold value correction amount $\Delta Th_{hosei}$ is a negative value, i.e., when the preceding vehicle is decelerating, the initial threshold value Th is corrected to a larger value. Also, the threshold value correction amount $\Delta Th_{hosei}$ is set such that its absolute value becomes larger as the host vehicle speed Vh decreases and smaller as the following distance X increases. When the host vehicle speed Vh is equal to or below a prescribed value V0, the threshold value correction amount $\Delta Th_{hosei}$ is not changed with respect to changes in the host vehicle speed Vh. As a result, when the host vehicle speed Vh is low, the actuation reaction force control can be commenced and ended at appropriate times even if the preceding vehicle is far away.

The third embodiment just described can provide the following operational effects in addition to the effects provided by the first embodiment.

In the third embodiment, the threshold value correcting unit 52 of the controller 50 gives priority to the correction of the threshold value Th based on the host vehicle speed Vh over the correction based on the traveling distance X. More specifically, after it calculates the threshold value correction amount $\Delta Th5$ based on the host vehicle speed Vh, the threshold value correcting unit 52 calculates the threshold value offset amount $\Delta Th_{offset}$ based on the following distance X and offsets the threshold value correction amount $\Delta Th5$. By calculating the threshold value correction amount $\Delta Th_{hosei}$ as shown in FIG. 22, the threshold value Th can be corrected reliably and the actuation reaction force control start timing can be adjusted appropriately so as to achieve a reliable control effect when the host vehicle speed Vh is low, even if the following distance X is large.

Fourth Embodiment

Figure 23:
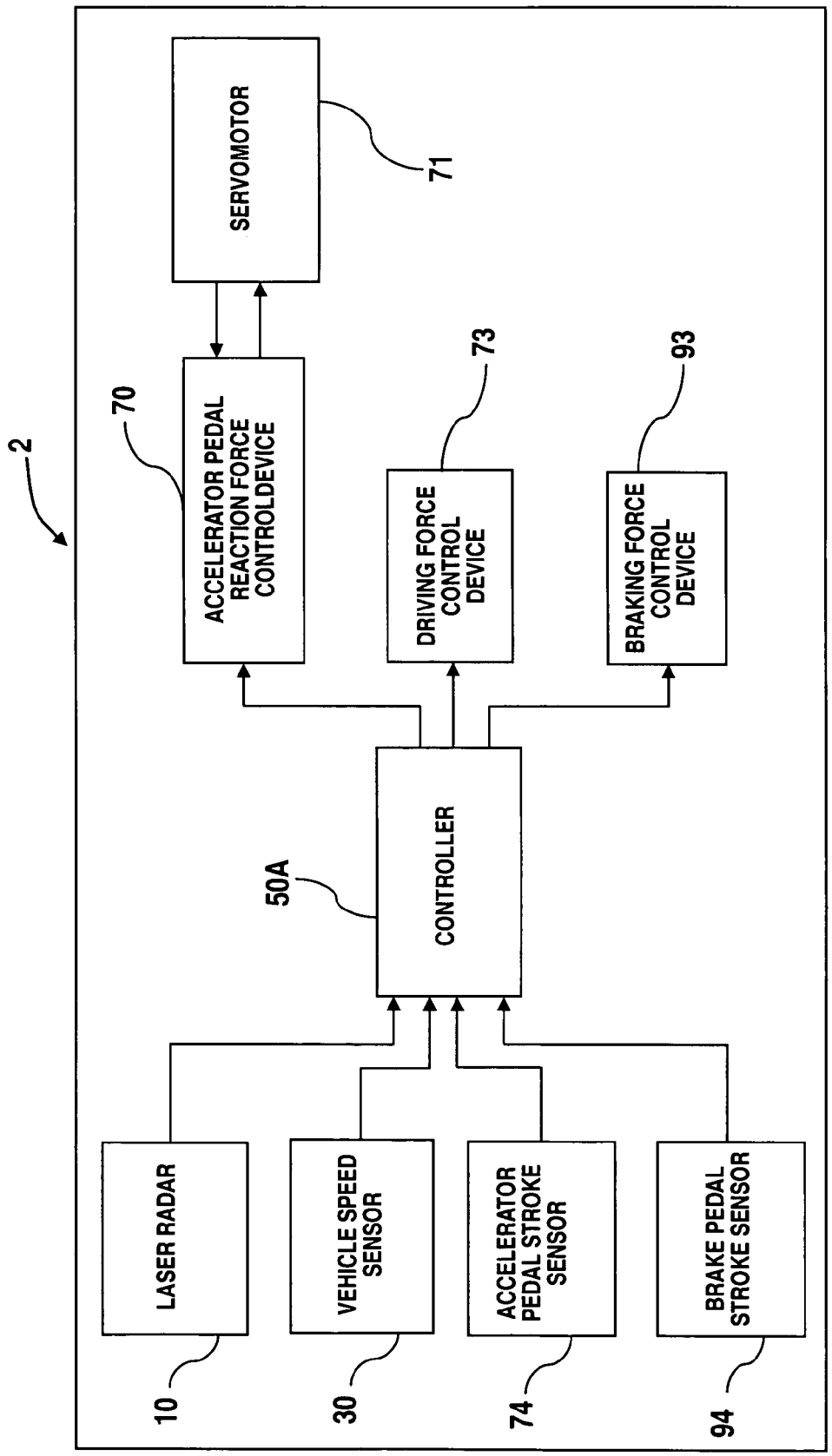
FIG. 23 is a system diagram of a vehicle driving assist system in accordance with a fourth embodiment of the present invention.
Figure 24:
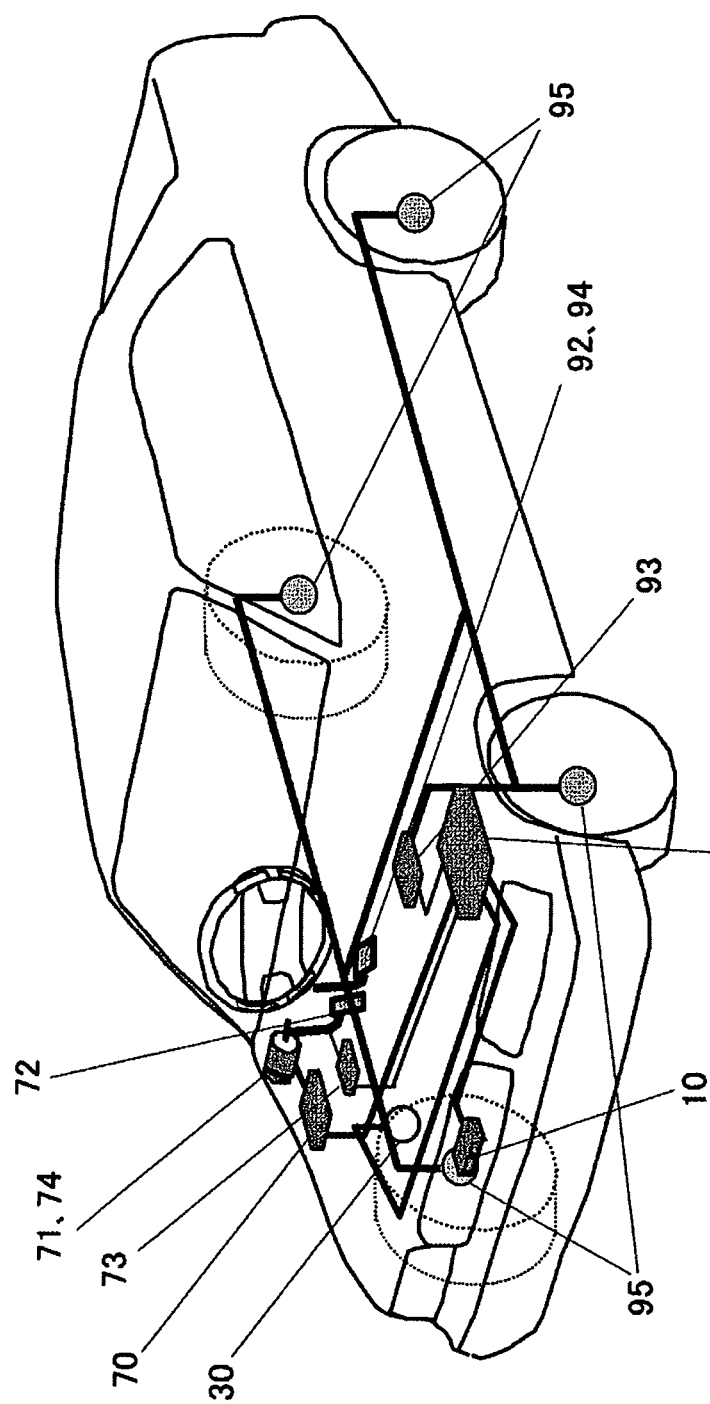
FIG. 24 is a schematic view of a vehicle in which the vehicle driving assist system shown in FIG. 23 is installed.

Referring now to FIGS. 23 to 33, a vehicle driving assist system 2 in accordance with a fourth embodiment will now be explained. FIG. 23 is a system diagram showing the vehicle driving assist system 2 in accordance with the fourth embodiment. FIG. 24 is a schematic view of a host vehicle in which the vehicle driving assist system 2 is installed in accordance with the fourth embodiment. In view of the similarity between the first and fourth embodiments, the parts of FIGS. 23 and 24 having the same functions as the parts of the first embodiment shown in FIGS. 1 and 2 are indicated with the same reference numerals. Thus, the descriptions of the parts of the fourth embodiment that are identical to the parts of the first embodiment will be omitted for the sake of brevity.

As shown in FIG. 23, the vehicle driving assist system 2 is further provided with a driving force control device 73 configured to control a driving force exerted against the host vehicle, a braking force control device 93 configured to control a braking force exerted against the host vehicle, an accelerator pedal stroke sensor 74, and a brake pedal stroke sensor 94.

An accelerator pedal stroke sensor 74 is configured and arranged to detect the depression amount (actuation amount) of the accelerator pedal 72. The accelerator pedal stroke sensor 74 can be either a device that is configured and arranged to actually measure the pedal depression amount directly, or a device that is configured and arranged to indirectly measure the pedal depression amount, e.g., a throttle opening sensor. The accelerator pedal stroke sensor 74 is configured and arranged to output a signal indicative of the depression amount (actuation or operation amount) of the accelerator pedal 72. The depression amount of the accelerator pedal 72 is converted into a rotation angle of the servomotor 71 by a linkage mechanism. The accelerator pedal stroke sensor 74 outputs the detected accelerator pedal actuation amount to the controller 50. A brake pedal stroke sensor 94 is configured and arranged to detect the depression amount (actuation amount) of the brake pedal 92 and sends the detected brake pedal actuation amount to the controller 50A that is the same as the controller 50, but with different programming.

Figure 25:
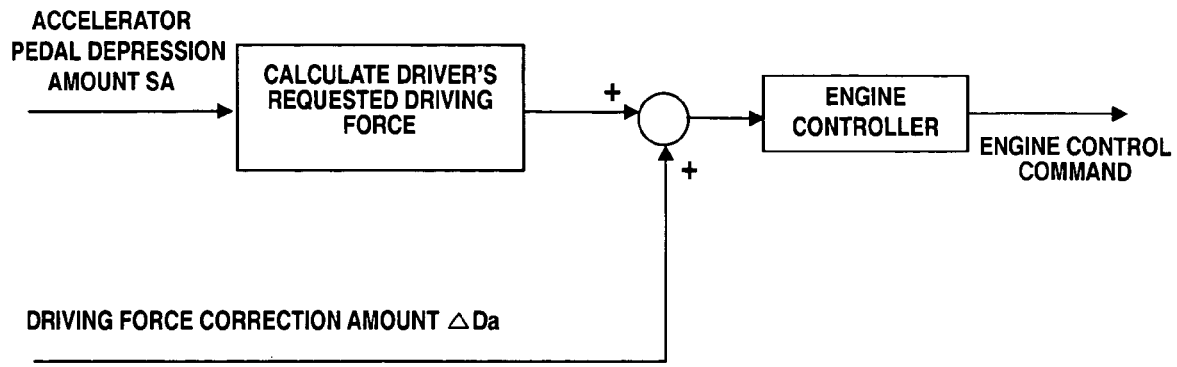
FIG. 25 is a diagram for explaining the general concept of the driving force control.
Figure 26:
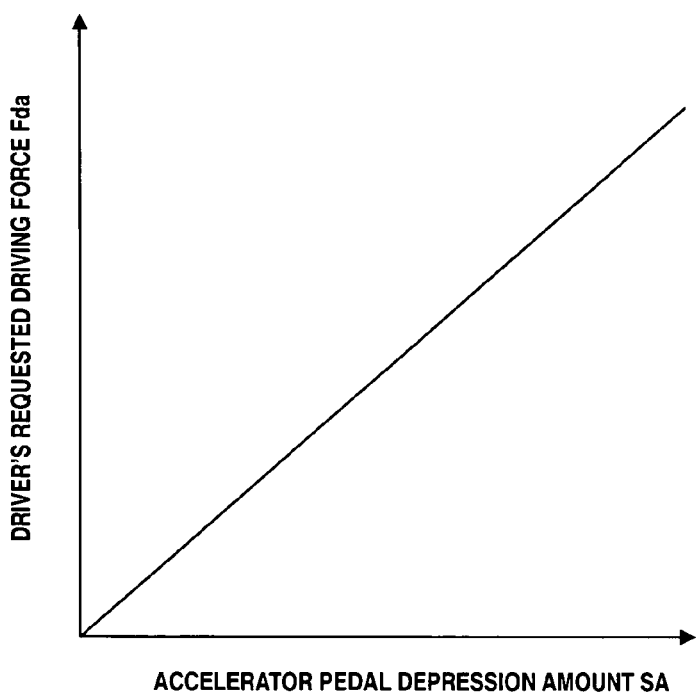
FIG. 26 is a plot of the requested driving force versus the accelerator pedal depression amount.

The driving force control device 73 is configured to calculate a control command for the engine. FIG. 25 is a block diagram of the driving force control executed by the driving force control device 73. FIG. 26 is a characteristic map plotting the driver's requested driving force Fda versus the accelerator pedal actuation amount SA. The driving force control device 73 uses a map like that shown in FIG. 26 to calculate the driver's requested driving force Fda based on the accelerator pedal actuation amount SA. The driving force control device 73 adds a driving force correction amount $\Delta Da$ (explained later) to the driver's requested driving force Fda so as to calculate a target driving force. The driving force control device 73 has an engine controller that calculates a control command for the engine based on the target driving force.

Figure 27:
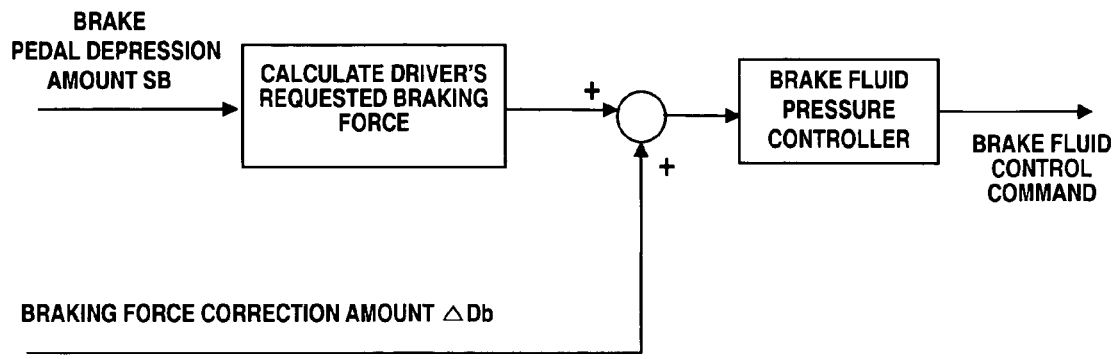
FIG. 27 is a diagram for explaining the general concept of the braking force control.
Figure 28:
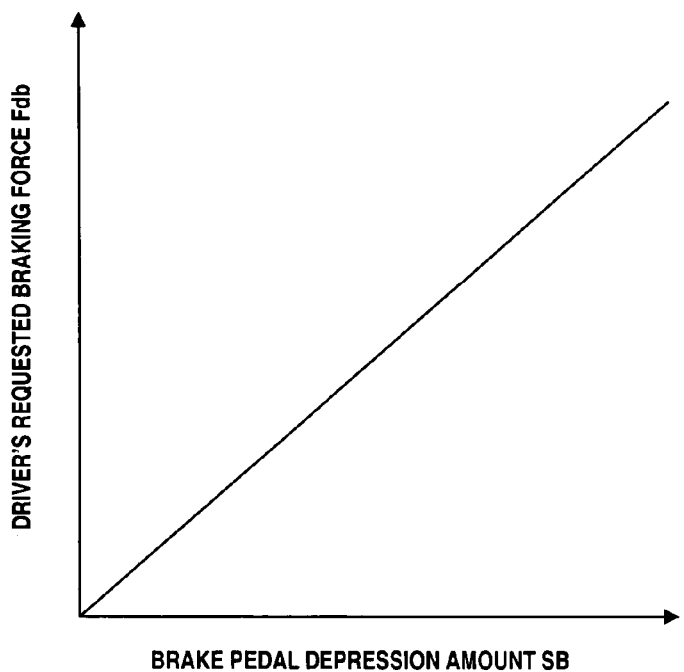
FIG. 28 is a plot of the requested braking force versus the brake pedal depression amount.

The braking force control device 93 is configured to output a brake fluid pressure command. FIG. 27 is a block diagram of the braking force control executed by the braking force control device 93. FIG. 28 is a characteristic map plotting the driver's requested braking force Fdb versus the brake pedal actuation amount SB. The driving force control device 93 uses a map like that shown in FIG. 28 to calculate the driver's requested braking force Fdb based on the brake pedal actuation amount SB. The driving force control device 93 adds a braking force correction amount $\Delta Db$ (explained later) to the driver's requested driving force Fdb so as to calculate a target braking force. The braking force control device 93 has a brake fluid pressure controller configured to output a brake fluid pressure command based on the target braking force. A brake device 95 is provided on each of the wheels of the host vehicle. The brake devices 95 operate in accordance with a control command issued from the brake fluid pressure controller.

Figure 29:
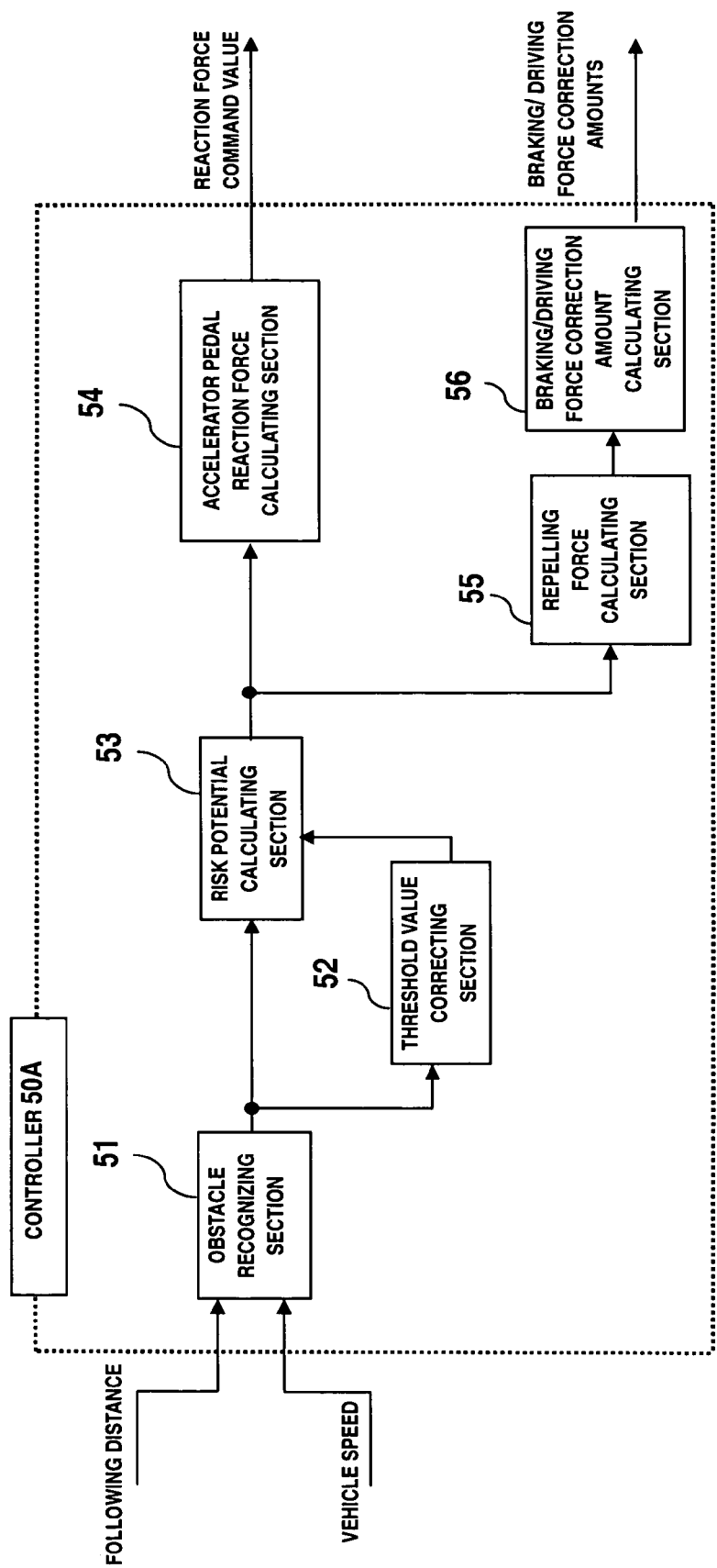
FIG. 29 is a block diagram showing the internal components of the controller of the fourth embodiment.

FIG. 29 is a simplified block diagram of the internal and peripheral components of the controller 50A. The controller 50A preferably includes a microcomputer with a control program that controls the system 2 in a manner as discussed below. The controller 50A can also include other conventional components such as an input interface circuit, an output interface circuit, and storage devices such as a ROM (Read Only Memory) device and a RAM (Random Access Memory) device. Thus, the internal and peripheral components of the controller 50A are configured such that the controller 50 includes the same sections the controller 50, as discussed above, but further includes a repelling force calculating unit or section 55, and a braking/driving force correction amount calculating unit or section 56. Based on the risk potential RP, the repelling force calculating unit 55 calculates a reference repelling force for calculating a driving force correction amount $\Delta Da$ and a braking force correction amount $\Delta Db$. The braking/driving force correction amount calculating unit 56 calculates correction amounts ($\Delta Da$ and $\Delta Db$) for the braking and driving forces exerted against the host vehicle based on the repelling force corrected by the repelling force calculating unit or section 55.

Figure 30:
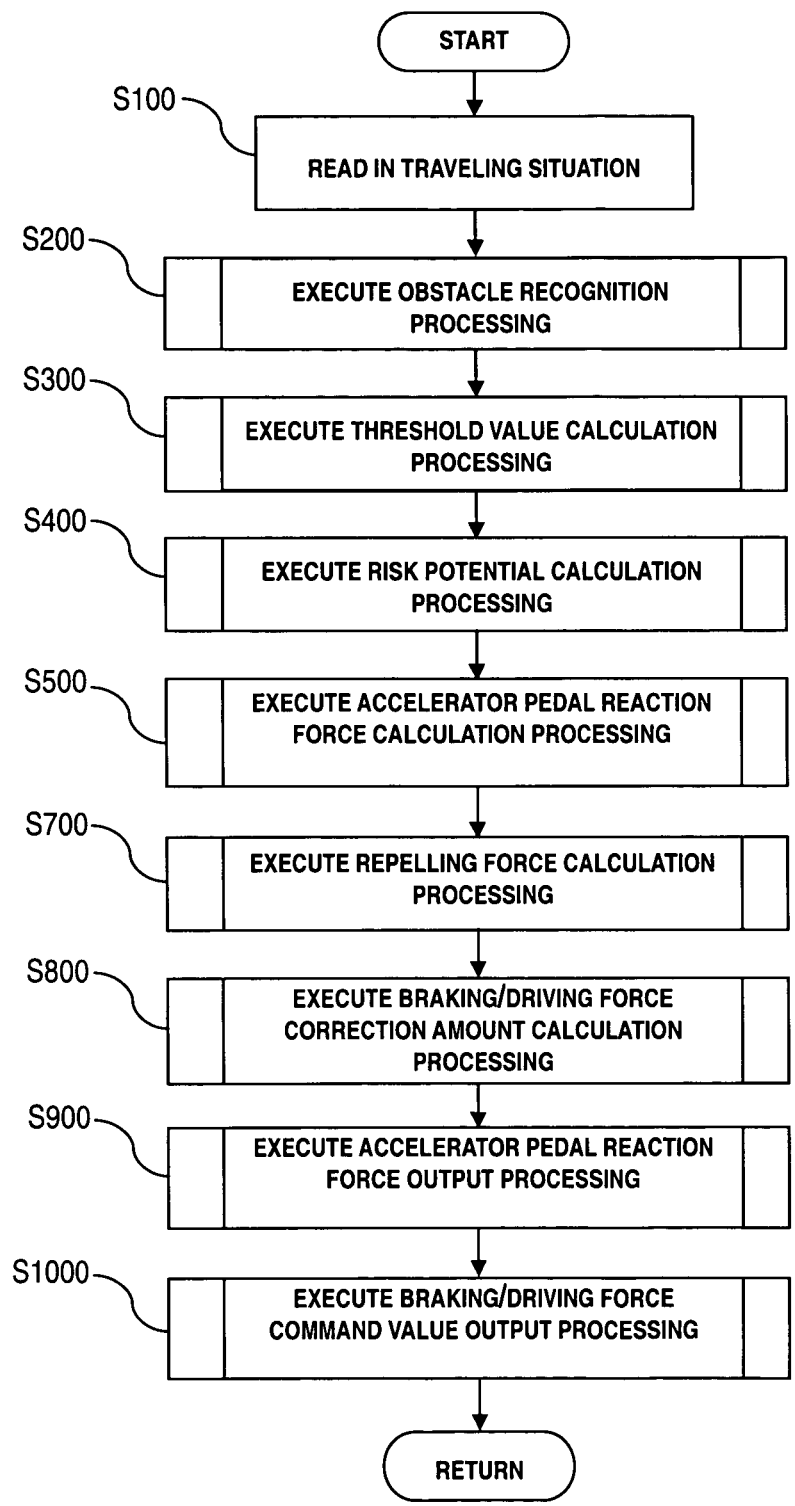
FIG. 30 is a flowchart showing the processing steps of a driving assistance control program in accordance with the fourth embodiment.
Figure 31:
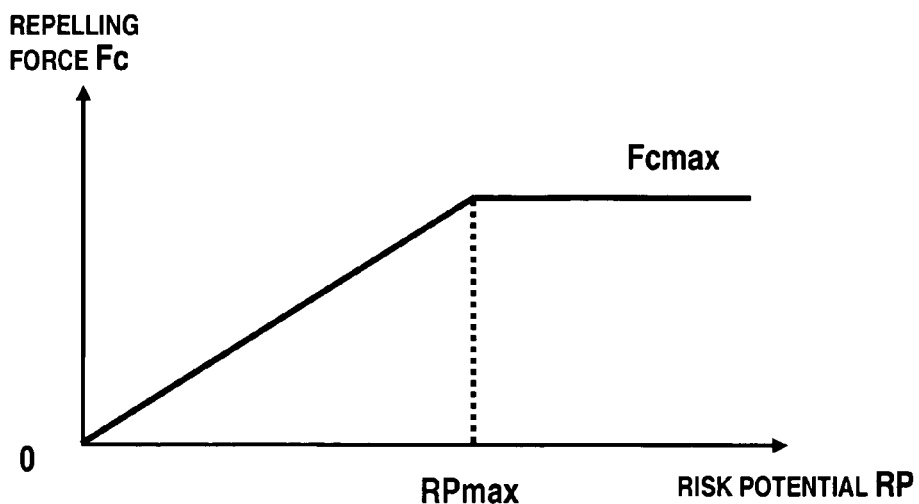
FIG. 31 is a plot of the repelling force versus the risk potential.
Figure 32:
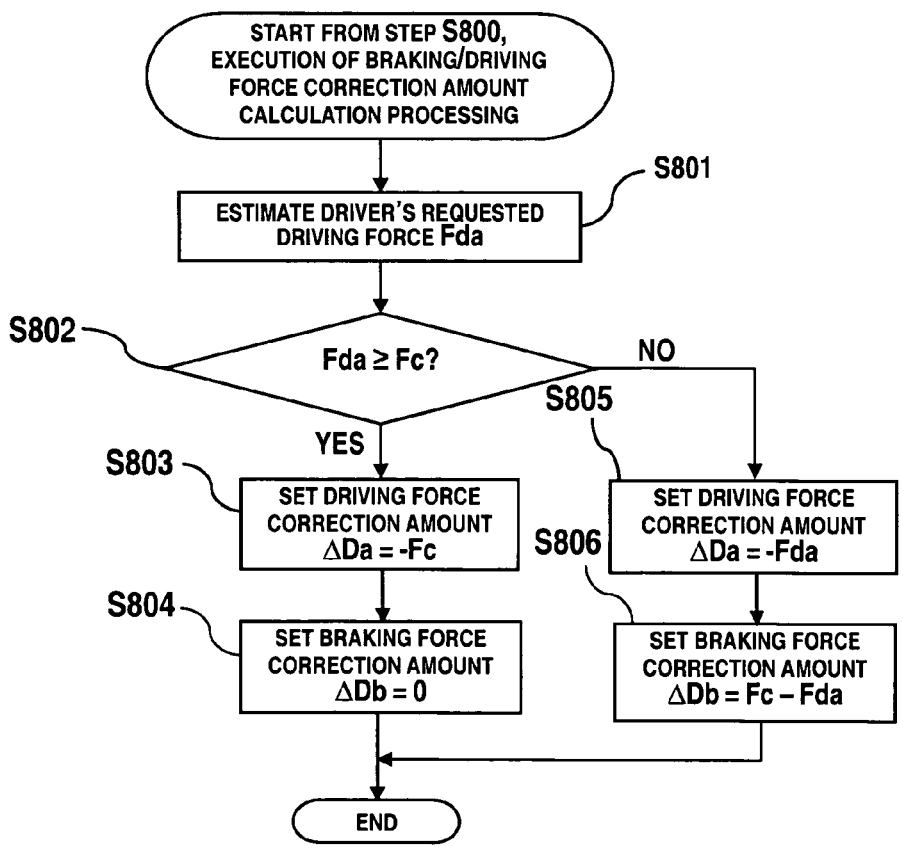
FIG. 32 is a flowchart for explaining the processing steps executed in order to calculate the driving force correction amount and the braking force correction amount.

The operation of the vehicle driving assist system 2 in accordance with the fourth embodiment will now be explained with reference to FIG. 30. FIG. 30 is a flowchart showing the control processing steps of the driving assistance control executed by the controller 50A in the fourth embodiment. This control loop is executed continuously once per prescribed time period, e.g., every 50 msec. The control processing of the steps S100 to S500 is the same as in the flowchart shown in FIG. 4 and explanations of those steps are omitted for the sake of brevity.

In step S700, the controller 50A calculates a repelling force Fc to be used for calculating a the driving force correction amount $\Delta Da$ and the braking force correction amount $\Delta Db$. The calculation of the repelling force Fc is based on the risk potential RP calculated in step S400. The repelling force Fc can be thought of as the spring force of the imaginary elastic body 300 shown in diagrams (a) and (b) of FIG. 9. The repelling force Fc is calculated according to a relationship like that shown in FIG. 31 such that the larger the risk potential RP is, the larger the calculated value of the repelling force Fc becomes. When the risk potential RP exceeds a prescribed value RPm, the repelling force Fc becomes fixed at a maximum value Fcmax.

In step S800, the controller 50A calculates a driving force correction amount ΔDa for correcting the driving force exerted against the host vehicle and a braking force correction amount ΔDb for correcting the braking force exerted against the host vehicle. The calculations are based on the repelling force Fc calculated in step S700. The control processing executed in step S800 now be explained with reference to the flowchart of FIG. 32.

In step S801, the controller 50A estimates the driver's requested driving force Fda. A map like that shown in FIG. 26 is stored in the controller 50A and the driver's requested driving force Fda is estimated based on the accelerator pedal actuation amount SA by referring to the map. In step S802, the controller 50A compares the driver's requested driving force Fda estimated in step S801 to the repelling force Fc calculated in step S700. If the driver's requested driving force Fda is equal to or larger than the repelling force Fc (Fda≥Fc), the controller 50A then proceeds to step S803. In step S803, the controller 50A sets the driving force correction amount ΔDa to the value −Fc. The controller 50A then sets the braking force correction amount ΔDb to 0 in step S804.

In other words, since the difference Fda−Fc is equal to or larger than 0 (i.e., Fda−Fc≥0), a positive driving force will remain even after the driving force Fda is corrected based on the repelling force Fc. Thus, the required correction amount output can be accomplished with only the driving force control device 73 outputting a correction amount. When this control is executed, the host vehicle will behave in such a fashion that the full driving force expected by the driver will not be delivered even though the driver is depressing the accelerator pedal 72. If the corrected driving force is larger than the running resistance, the driver will feel the host vehicle exhibit more sluggish acceleration behavior (acceleration becomes sluggish). If the corrected driving force is smaller than the traveling resistance, the driver will feel the host vehicle decelerate.

Meanwhile, if the result of step S802 is negative, i.e., if the driving force Fda Fda is smaller than the repelling force Fc (Fda<Fc), the targeted correction amount cannot be obtained with correction amount output from the driving force control device 73 alone. Therefore, the controller 50A proceeds to step S805 and sets the driving force correction amount ΔDa to −Fda. Then, in step S806, the controller 50A sets the braking force correction amount ΔDb to the amount by which the correction amount ΔDa is insufficient (Fc−Fda). The driver perceives this control as deceleration behavior of the host vehicle.

Figure 33:
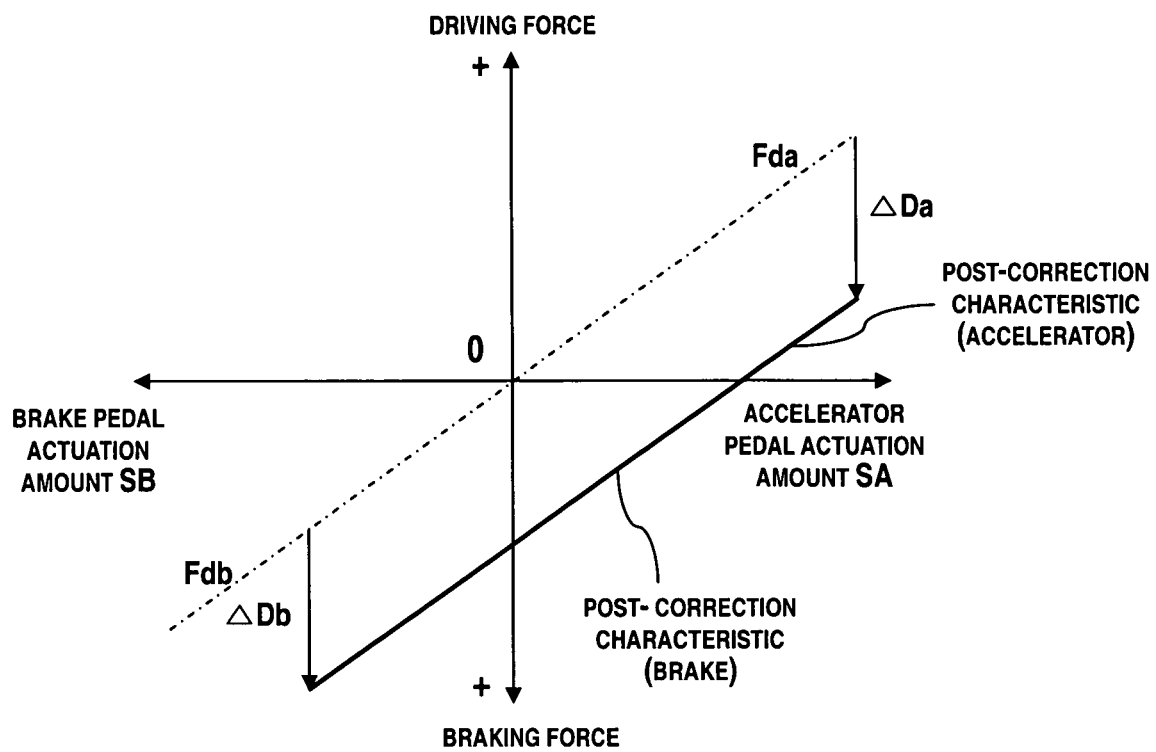
FIG. 33 is a characteristic curve plot for explaining how the driving force and the braking force are corrected.

FIG. 33 is a diagram for explaining the method of correcting the driving force and the braking force. The horizontal axis of FIG. 33 indicates the accelerator pedal actuation amount SA and the brake pedal actuation amount SB. The accelerator pedal actuation amount SA increases as one moves to the right from the origin 0 and the brake pedal actuation amount SB increases as one moves to the left from the origin 0. The vertical axis of FIG. 33 indicates the driving force and the braking force. The driving force increases as one moves upward from the origin 0 and the braking force increases as one moves downward from the origin 0. The single-dot chain line in FIG. 33 indicates the requested driving force Fda versus the accelerator pedal actuation amount SA and the requested braking force Fdb versus the brake pedal actuation amount SB. The corrected driving force and braking force (corrected based on the repelling force Fc) are indicated with a solid line.

When the accelerator pedal actuation amount SA is large and the requested driving force Fda corresponding to the accelerator pedal actuation amount SA is equal to or larger than the repelling force Fc, the driving force is reduced by the correction amount ΔDa. Meanwhile, when the accelerator pedal actuation amount SA is small and the requested driving force Fda corresponding to the accelerator pedal actuation amount SA is smaller than the repelling force Fc, the driving force is corrected to zero by setting the correction amount ΔDa to such a value that the driving force will be reduced to zero. The difference between the repelling force Fc and the requested driving force Fda is set as the correction amount ΔDb. As a result, light braking is executed in accordance with the accelerator pedal actuation amount SA.

When the brake pedal 92 is depressed, the braking force is increased based on the correction amount ΔDb. As a result, the braking/driving force characteristic is corrected in such a fashion that the total travel resistance of the host vehicle is increased by the correction amount, i.e., by an amount equivalent to the repelling force Fc of the imaginary elastic body.

After the controller 50A calculates the driving force correction amount ΔDa and the braking force correction amount ΔDb in step S800, the controller 50 proceeds to step S900. In step S900, the controller 50 sends the accelerator pedal reaction force control command value FA calculated in step S500 to the accelerator pedal reaction force control device 70. The accelerator pedal reaction force control device 70 controls the actuation reaction force exerted by the accelerator pedal 72 based on the command value received from the controller 50A.

In step S1000, the controller 50A sends the driving force correction amount ΔDa and braking force correction amount ΔDb calculated in step S800 to the driving force control device 73 and the braking force control device 93, respectively. The driving force control device 73 calculates a target driving force based on the driving force correction amount ΔDa and the requested driving force Fda and controls the engine controller such that the calculated target driving force is generated. The braking force control device 93 calculates a target braking force based on the braking force correction amount ΔDb and the requested braking force Fdb and controls the brake fluid pressure controller such that the target braking force is generated. After the command values are sent, the current control loop ends.

The fourth embodiment just described can provide the following operational effects in addition to the effects provided by the first embodiment.

The vehicle driving assist system 2 is provided with the accelerator pedal stroke sensor 74 configured to detect the actuation amount of the accelerator pedal 72, a braking/driving force correction amount calculating unit 56 configured to correct the characteristic curve expressing the relationship between the generated drive torque and the accelerator pedal actuation amount SA downward based on the risk potential RP (i.e., such that a smaller drive torque is generated with respect to a given actuation amount SA), and the driving force control device 73 configured to control the driving force such that the corrected drive torque is generated. By executing control such that the driving force generated against the host vehicle is lowered in accordance with the risk potential RP, the fact that a risk potential RP exists can be conveyed to the driver in an intuitive manner by causing the driver to feel a sensation of deceleration.

Although the fourth embodiment is configured to execute accelerator pedal actuation reaction force control and braking/driving force control based on the risk potential RP, the invention is not limited to such a configuration. For example, it is acceptable to execute braking/driving force control only based on the risk potential RP. It is also acceptable to control only the braking force or only the driving force. Also, using the brake pedal 92 (driver-operated driving operation device), it is also possible to control the actuation reaction force generated in (exerted by) the brake pedal 92 based on the risk potential RP. In other words, the system can be configured to control any one or more of an actuation reaction force generated in a driver-operated driving operation device, a braking force exerted against the host vehicle, and a driving force exerted against the host vehicle based on the calculated risk potential.

The fourth embodiment can also be combined with the second or third embodiment. In other words, the accelerator pedal reaction force control command value FA and the repelling force Fc can be calculated using a risk potential RP that was calculated based on a corrected threshold value $Th_{hosei}$ calculated in accordance with the second or third embodiment.

In the first to fourth embodiments, the model shown in diagrams (a) and (b) of FIG. 9 is assumed and the repelling force of the imaginary elastic body 300 when it is compressed against a preceding obstacle is calculated as a risk potential RP. However, the invention is not limited to such an approach. It is also feasible to calculate a risk potential RP using a time to collision TTC between the host vehicle and a preceding obstacle or a time to head way (following time) THW calculated by dividing the following distance X by the host vehicle speed Vh or to calculate a risk potential RP using a combination of the time to collision TTC and the time to head way THW. It is also possible to determine when to commence actuation reaction force control or braking/driving force control using the time to head way THW instead of the time to collision TTC.

In the first to fourth embodiments, the corrected threshold value $Th_{hosei}$ is calculated based on the acceleration a1 of the preceding obstacle, the host vehicle speed Vh, and the following distance X. However, the invention is not limited to this calculation method. So long as the calculation of the corrected threshold value $Th_{hosei}$ is based on acceleration a1 of the preceding obstacle, the threshold value Th can be corrected in a manner that takes into account the effect that the acceleration a1 of the preceding obstacle has on the host vehicle. However, by basing the calculation of the corrected threshold value $Th_{hosei}$ on the host vehicle speed Vh and the following distance X, which indicate different aspects of the traveling circumstances, in addition to the acceleration a1 of the preceding obstacle, a corrected threshold value $Th_{hosei}$ that is even better matched to the actual traveling circumstances (traveling situation) can be calculated.

In the first to fourth embodiments, the laser radar 10 and vehicle speed sensor 30 function as the traveling situation detecting section. The risk potential calculating unit 53 functions as the risk potential calculating section. The preceding obstacle recognizing unit 51 functions as the preceding obstacle acceleration computing section. The threshold value correcting unit 52 functions as the control execution threshold value correcting section. The accelerator pedal stroke sensor 74 functions as the accelerator pedal actuation amount detecting section. Additionally, the controller 50 or 50A, the accelerator pedal reaction force control device 70, the driving force control device 73, and the braking force control device 93 function as the control section. The accelerator pedal reaction force calculating unit 54 functions as the actuation force reaction force calculating section. The accelerator pedal reaction force control device 70 functions as the actuation reaction force generating section. The braking/driving force correction amount calculating section 56 functions as the drive torque correcting section. The driving force control device 73 functions as the driving force control section. However, the invention is not limited to these specific components. For example, a milliwave radar of a different format can be used instead of the laser radar 10 as the preceding obstacle detecting section or traveling situation detecting section. The explanations presented above are merely examples. When interpreting the present invention, the invention should not be limited or restrained in any way by the corresponding relationships between the embodiments and the claims.

What is claimed is:

1. A vehicle driving assist system comprising:
a traveling situation detecting section configured to output a traveling situation detection result based on at least a following distance between a host vehicle and a preceding obstacle and a host vehicle speed of the host vehicle;
a risk potential calculating section configured to calculate a risk potential indicative of a degree of convergence between the host vehicle and the preceding obstacle based on the traveling situation detection result of the traveling situation detecting section, the risk potential calculating section being further configured to calculate the risk potential as a spring force that results when an imaginary elastic body imaginary provided on a front of the host vehicle contacts the preceding obstacle and is compressed;
a control section configured to perform a driver notification controlling operation, by a controller, that produces at least one of an actuation reaction force exerted by an accelerator pedal of the host vehicle and a braking/driving force exerted against the host vehicle based on the risk potential calculated by the risk potential calculating section;
a preceding obstacle acceleration computing section configured to compute an acceleration of the preceding obstacle based on the traveling situation detection result of the traveling situation detecting section; and
a control execution threshold value correcting section configured to calculate a corrected control execution threshold value based on both a preliminary control execution threshold value and the acceleration of the preceding obstacle computed by the preceding obstacle acceleration computing section, the control execution threshold value correcting section being further configured to calculate the corrected control execution threshold value such that the corrected control execution threshold value decreases in response to the proceeding vehicle being accelerating and the corrected control execution threshold value increases in response to the proceeding vehicle being decelerating,
the risk potential calculating section being further configured to calculate an amount of time until the host vehicle contacts the preceding obstacle,
the risk potential calculating section being further configured to calculate a reference length corresponding to a length of the imaginary elastic body based on the corrected control execution threshold value and the host vehicle speed of the host vehicle in response to the amount of time until the host vehicle contacts the preceding obstacle being smaller than the corrected control execution threshold value, with the risk potential calculating section being further configured to calculate the risk potential based on the reference length corresponding to the length of the imaginary elastic body such that the risk potential increases as the following distance of the host vehicle with respect to the proceeding obstacle becomes shorter relative to the reference length corresponding to the length of the imaginary elastic body in response to the amount of time until the host vehicle contacts the preceding obstacle being smaller than the corrected control execution threshold value, the risk potential calculating section being further configured to set the risk potential to zero in response to the amount of time until the host vehicle contacts the preceding obstacle being equal to or larger than the corrected control execution threshold value, the control section being further configured to commence the driver notification controlling operation based on the risk potential calculated by the risk potential calculating section in response to the amount of time until the host vehicle contacts the preceding obstacle being smaller than the corrected control execution threshold value, with the control section being further configured to perform the driver notification controlling operation in at least one of the following manners: the actuation reaction force exerted by the accelerator pedal of the host vehicle increases as the risk potential calculated by the risk potential calculating section increases; and the driving force exerted against the host vehicle decreases and the braking force exerted against the host vehicle increases as the risk potential calculated by the risk potential calculating section increases.

2. The vehicle driving assist system as recited in claim 1, wherein the control section further includes
an actuation reaction force calculating section configured to calculate the actuation reaction force to be exerted by the accelerator pedal of the host vehicle based on the risk potential, and
an actuation reaction force generating section configured to cause the accelerator pedal to exert a reaction force equal to the actuation reaction force calculated by the actuation reaction force calculating section.

3. The vehicle driving assist system as recited in claim 1, further comprising an accelerator pedal actuation amount detecting section configured to detect an actuation amount of the accelerator pedal of the host vehicle,
the control section further including
a drive torque correcting section configured to calculate a corrected drive torque to reduce an amount of drive torque generated relative to the accelerator pedal actuation amount detected by the accelerator pedal actuation amount detecting section based on the risk potential, and
a drive force control section configured to control the driving force such that the corrected drive torque calculated by the drive torque correcting section is generated.

4. The vehicle driving assist system as recited in claim 1, wherein the control execution threshold value correcting section is further configured to calculate the corrected control execution threshold value such that the preliminary control execution threshold value is changed to commence the driver notification controlling operation at a later time when the acceleration of the preceding obstacle is a positive value and changed to commence the driver notification controlling operation at an earlier time when the acceleration of the preceding obstacle is a negative value.

5. The vehicle driving assist system as recited in claim 1, wherein the control execution threshold value correcting section is further configured to correct the preliminary control execution threshold value based on both the acceleration of the preceding obstacle and the following distance detected by the traveling situation detecting section, and
the control execution threshold value correcting section is further configured to correct the preliminary control execution threshold value by a smaller amount as the following distance becomes larger in order to obtain the corrected control execution threshold value.

6. The vehicle driving assist system as recited in claim 1, wherein the control execution threshold value correcting section is further configured to correct the preliminary control execution threshold value based on both the acceleration of the preceding obstacle and the host vehicle speed detected by the traveling situation detecting section, and
the control execution threshold value correcting section is further configured to correct the preliminary control execution threshold value by a smaller amount as the host vehicle speed detected by the traveling situation detecting section becomes larger in order to obtain the corrected control execution threshold value.

7. The vehicle driving assist system as recited in claim 5, wherein the control execution threshold value correcting section is further configured to set a correction amount by which the preliminary control execution threshold value is corrected to approximately zero when the following distance is equal to or larger than a first prescribed following distance value, and
the control execution threshold value correcting section is further configured to hold the correction amount by which the preliminary control execution threshold value is corrected at a fixed value when the following distance is equal to or smaller than a second prescribed following distance value that is smaller than the first prescribed following distance value.

8. The vehicle driving assist system as recited in claim 1, wherein the control execution threshold value correcting section is further configured to calculate the corrected control execution threshold value by correcting the preliminary control execution threshold value based on the acceleration of the preceding obstacle detected by the preceding obstacle acceleration computing section, the following distance detected by the traveling situation detecting section, and the host vehicle speed detected by the traveling situation detecting section.

9. The vehicle driving assist system as recited in claim 1, wherein the control execution threshold value correcting section is further configured to give priority to correcting the preliminary control execution threshold value based on the following distance detected by the traveling situation detecting section over correcting the preliminary control execution threshold value based on the host vehicle speed detected by the traveling situation detecting section.

10. The vehicle driving assist system as recited in claim 1, wherein the control execution threshold value correcting section is further configured to give priority to correcting the preliminary control execution threshold value based on the host vehicle speed detected by the traveling situation detecting section over correcting the preliminary control execution threshold value based on the following distance detected by the traveling situation detecting section.

11. The vehicle driving assist system as recited in claim 1, wherein
the traveling situation detecting section is further configured to detect a relative velocity between the host vehicle and the preceding obstacle, and
the risk potential calculating section is further configured to calculate the amount of time until the host vehicle contacts the preceding obstacle by dividing the following distance by the relative velocity.

12. The vehicle driving assist system as recited in claim 2, wherein
the traveling situation detecting section is further configured to detect a relative velocity between the host vehicle and the preceding obstacle, and
the risk potential calculating section is further configured to calculate the amount of time until the host vehicle contacts the preceding obstacle by dividing the following distance by the relative velocity.

13. The vehicle driving assist system as recited in claim 3, wherein
the traveling situation detecting section is further configured to detect a relative velocity between the host vehicle and the preceding obstacle, and
the risk potential calculating section is further configured to calculate the amount of time until the host vehicle contacts the preceding obstacle being calculated by dividing the following distance by the relative velocity.

14. A vehicle driving assist system comprising:
traveling situation detecting means for outputting a traveling situation detection result based on at least a following distance between a host vehicle and a preceding obstacle and a host vehicle speed of the host vehicle;
risk potential calculating means for calculating a risk potential indicative of a degree of convergence between the host vehicle and the preceding obstacle based on the traveling situation detection result, the risk potential calculating means further performing a function of calculating the risk potential as a spring force that results when an imaginary elastic body imaginary provided on a front of the host vehicle contacts the preceding obstacle and is compressed;
control means for performing a driver notification controlling operation that produces at least one of an actuation reaction force exerted by an accelerator pedal of the host vehicle and a braking/driving force exerted against the host vehicle based on the risk potential that was calculated;
preceding obstacle acceleration computing means for computing an acceleration of the preceding obstacle based on the traveling situation detection; and
a control execution threshold value correcting means for calculating a corrected control execution threshold value based on both a preliminary control execution threshold value and the acceleration of the preceding obstacle that was computed, the control execution threshold value correcting means further performing a function of calculating the corrected control execution threshold value such that the corrected execution threshold value decreases in response to the proceeding vehicle being accelerating and the corrected execution threshold value increases in response to the proceeding vehicle being decelerating,
the risk potential calculating means further performing a function of calculating an amount of time until the host vehicle contacts the preceding obstacle,
the risk potential calculating means further performing a function of calculating a reference length corresponding to a length of the imaginary elastic body based on the corrected control execution threshold value and the host vehicle speed of the host vehicle in response to the amount of time until the host vehicle contacts the preceding obstacle being smaller than the corrected control execution threshold value, with the risk potential calculating means further performing the function of calculating the risk potential based on the reference length corresponding to the length of the imaginary elastic body such that the risk potential increases as the following distance of the host vehicle with respect to the proceeding obstacle becomes shorter relative to the reference length corresponding to the length of the imaginary elastic body in response to the amount of time until the host vehicle contacts the preceding obstacle being smaller than the corrected control execution threshold value,
the risk potential calculating means further performing a function of setting the risk potential to zero in response to the amount of time until the host vehicle contacts the preceding obstacle being equal to or larger than the corrected control execution threshold value,
the control means further performing a function of commencing the driver notification controlling operation based on the risk potential in response to the amount of time until the host vehicle contacts the preceding obstacle being smaller than the corrected control execution threshold value, with the control means further performing the driver notification controlling operation in at least one of the following manners: the actuation reaction force exerted by the accelerator pedal of the host vehicle increases as the risk potential increases; and the driving force exerted against the host vehicle decreases and the braking force exerted against the host vehicle increases as the risk potential increases.

15. A vehicle equipped with the vehicle driving assist system according to claim 1.

16. A vehicle driving assistance method comprising:
determining a risk potential indicative of a degree of convergence between a host vehicle and a preceding obstacle based on at least a following distance between the host vehicle and the preceding obstacle and a host vehicle speed of the host vehicle, the determination of the risk potential further including calculating the risk potential as a spring force that results when an imaginary elastic body imaginary provided on a front of the host vehicle contacts the preceding obstacle and is compressed;
performing a driver notification controlling operation that produces at least one of an actuation reaction force exerted by an accelerator pedal of the host vehicle and a braking/driving force exerted against the host vehicle based on the risk potential that was calculated;
determining an acceleration of the preceding obstacle based on the following distance and the host vehicle speed; and
determining a corrected control execution threshold value based on both an initial threshold value used to determine a commence timing of the driver notification controlling operation and the acceleration of the preceding obstacle by changing the initial threshold value based on the acceleration of the preceding obstacle such that the corrected execution threshold value decreases in response to the proceeding vehicle being accelerating and the corrected execution threshold value increases in response to the proceeding vehicle being decelerating, the calculation of the risk potential further including calculating a reference length corresponding to a length of the imaginary elastic body based on the corrected control execution threshold value and the host vehicle speed of the host vehicle in response to an amount of time until the host vehicle contacts the preceding obstacle being smaller than the corrected control execution threshold value, with the calculation of the risk potential further including calculating the risk potential based on the reference length corresponding to the length of the imaginary elastic body such that the risk potential increases as the following distance of the host vehicle with respect to the proceeding obstacle becomes shorter relative to the reference length corresponding to the length of the imaginary elastic body in response to the amount of time until the host vehicle contacts the preceding obstacle being smaller than the corrected control execution threshold value, the calculation of the risk potential further including setting the risk potential to zero in response to the amount of time until the host vehicle contacts the preceding obstacle being equal to or larger than the corrected control execution threshold value, the performing of the driver notification controlling operation further including commencing the driver notification controlling operation based on the risk potential in response to the amount of time until the host vehicle contacts the preceding obstacle being smaller than the corrected control execution threshold value, with the driver notification controlling operation being performed in at least one of the following manners: the actuation reaction force exerted by the accelerator pedal of the host vehicle increases as the risk potential increases; and the driving force exerted against the host vehicle decreases and the braking force exerted against the host vehicle increases as the risk potential increases.

17. The vehicle driving assist system as recited in claim 1, wherein the traveling situation detecting section is further configured to detect a relative velocity between the host vehicle and the preceding obstacle, and the risk potential calculating section is further configured to calculate the amount of time until the host vehicle contacts the preceding obstacle by at least one of dividing the following distance by the relative velocity and dividing the following distance by the host vehicle speed.

* * * * *